United States Patent
Sato et al.

(10) Patent No.: US 11,946,425 B2
(45) Date of Patent: Apr. 2, 2024

(54) ENGINE CONTROL DEVICE AND ENGINE CONTROL METHOD

(71) Applicant: Hitachi Astemo, Ltd., Hitachinaka (JP)

(72) Inventors: Sho Sato, Hitachinaka (JP); Akihito Kubota, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/642,161

(22) PCT Filed: Nov. 4, 2020

(86) PCT No.: PCT/JP2020/041224
§ 371 (c)(1),
(2) Date: Mar. 10, 2022

(87) PCT Pub. No.: WO2021/095606
PCT Pub. Date: May 20, 2021

(65) Prior Publication Data
US 2022/0325673 A1    Oct. 13, 2022

(30) Foreign Application Priority Data
Nov. 13, 2019    (JP) .................... 2019-205416

(51) Int. Cl.
*G01M 15/06*    (2006.01)
*F02D 41/00*    (2006.01)
*F02D 41/22*    (2006.01)

(52) U.S. Cl.
CPC ......... *F02D 41/009* (2013.01); *F02D 41/222* (2013.01); *G01M 15/06* (2013.01); *F02D 2200/101* (2013.01)

(58) Field of Classification Search
CPC .............. F02D 41/009; F02D 41/222; F02D 2200/101; G01M 15/06
See application file for complete search history.

(56) References Cited

U.S. PATENT DOCUMENTS

| 6,341,253 B1 | 1/2002 | Honda |
| 8,978,453 B2 * | 3/2015 | Fayyad ................. G01M 15/06 73/114.01 |

(Continued)

FOREIGN PATENT DOCUMENTS

| CN | 106285979 A | 1/2017 |
| JP | 8-61204 A | 3/1996 |

(Continued)

OTHER PUBLICATIONS

International Preliminary Report on Patentability (PCT/IB/338 & PCT/IB/373) issued in PCT Application No. PCT/JP2020/041224 dated May 27, 2022, including English translation of document C2 (Japanese-language Written Opinion (PCT/ISA/237), filed on Mar. 10, 2022) (seven (7) pages).

(Continued)

*Primary Examiner* — Gonzalo Laguarda
(74) *Attorney, Agent, or Firm* — Crowell & Moring LLP

(57) ABSTRACT

The present invention provides an engine control device that sets a cam signal read value according to a cam signal output from a cam angle sensor, in a front-rear determination position; if the cam signal read value is alternately changed between 1 (LOW) and 2 (HIGH) in the front-rear determination position, sets the cam signal read value to the cam signal expected value; if the cam signal read value is not alternately changed between 1 (LOW) and 2 (HIGH), inverts the cam signal expected value in the control cycle of the previous time, and sets the resultant cam signal expected value; then, when the cam signal read value and the cam signal expected value are equal to each other, distinguishes the cylinders by using the cam signal read value; and when the cam signal read value and the cam signal expected value are different from each other, distinguishes the cylinders by using the cam signal expected value.

18 Claims, 16 Drawing Sheets

(56) References Cited

U.S. PATENT DOCUMENTS

| | | | | |
|---|---|---|---|---|
| 9,575,933 | B2* | 2/2017 | Boehl | G06F 17/18 |
| 11,268,464 | B2* | 3/2022 | Rajkumar | G01M 15/06 |
| 2001/0011203 | A1* | 8/2001 | Ando | G01M 15/06 |
| | | | | 73/114.26 |
| 2007/0246012 | A1 | 10/2007 | Ando | |
| 2016/0160768 | A1* | 6/2016 | Koo | F02D 31/001 |
| | | | | 123/339.15 |

FOREIGN PATENT DOCUMENTS

| JP | 9-195906 A | 7/1997 |
|---|---|---|
| JP | 11-343919 A | 12/1999 |
| JP | 2001-90600 A | 4/2001 |
| JP | 2001-214794 A | 8/2001 |
| JP | 2002-180890 A | 6/2002 |
| JP | 2003-65139 A | 3/2003 |
| JP | 2006-169965 A | 6/2006 |
| JP | 2006-183593 A | 7/2006 |
| JP | 2013-29052 A | 2/2013 |
| JP | 2013-167223 A | 8/2013 |

OTHER PUBLICATIONS

International Search Report (PCT/ISA/210) issued in PCT Application No. PCT/JP2020/041224 dated Jan. 19, 2021 with English translation (six (6) pages).

Japanese-language Written Opinion (PCT/ISA/237) issued in PCT Application No. PCT/JP2020/041224 dated Jan. 19, 2021 (five (5) pages).

Extended European Search Report issued in European Application No. 20888583.0 dated Nov. 8, 2023 (8 pages).

* cited by examiner

ENGINE CONTROL DEVICE AND ENGINE CONTROL METHOD

TECHNICAL FIELD

The present invention relates to an engine control device and to an engine control method for distinguishing among (identifying) cylinders by the use of signals output from a crank angle sensor and a cam angle sensor.

BACKGROUND ART

For controlling an engine, it is necessary to distinguish among cylinders by the use of output signals from a crank angle sensor and a cam angle sensor, as disclosed in JP 2006-183593 A (Patent Document 1). The result of such cylinder distinguishing is used, for example, for controlling fuel injection and ignition in each cylinder.

REFERENCE DOCUMENT LIST

Patent Document

Patent Document 1: JP 2006-183593 A

SUMMARY OF THE INVENTION

Problem to be Solved by the Invention

When the cylinders are to be distinguished, noise superimposed on a cam signal for some reason leads to an abnormal cam signal, resulting in reduced accuracy of the cylinder distinguishing. If the fuel injection and the ignition are controlled in such a state, the fuel injection and the ignition may be performed for a cylinder which is not a target cylinder, and for example, a decrease in engine output or the like may result.

An object of the present invention is to provide an engine control device and an engine control method which suppress reducing of accuracy of cylinder distinguishing even when noise has been superimposed on an output signal from a cam angle sensor.

Means for Solving the Problem

For this reason, in the invention relating to the engine control device, the engine control device includes a crank angle sensor, a cam angle sensor and an electronic control unit. The crank angle sensor outputs a crank signal that includes an angular position signal for every predetermined angle and a reference position signal for every crank angle of 360°, with rotation of a crank shaft. The cam angle sensor outputs cam signals at different levels between a front reference position and a rear reference position of the crank signals, with rotation of a cam shaft. An electronic control unit determines an expected value according to a changed state of the cam signal, and when a value of the cam signal is equal to the expected value, the electronic control unit distinguishes among cylinders with the use of the cam signal, and when the value of the cam signal is different from the expected value, the electronic control unit distinguishes among the cylinders by use of the expected value.

In the invention relating to the engine control method, the electronic control unit can read each of the output signals from a crank angle sensor that outputs crank signals including an angular position signal for every predetermined angle and a reference position signal for every crank angle of 360°, with rotation of a crank shaft, and from a cam angle sensor that outputs cam signals at different levels between a front reference position and a rear reference position of crank signals, with rotation of a cam shaft. The electronic control unit determines an expected value according to a changed state of the cam signal, and when the value of the cam signal is equal to the expected value, the electronic control unit distinguishes among cylinders by the use of the cam signal, and when the value of the cam signal is different from the expected value, the electronic control unit distinguishes among the cylinders by use of the expected value.

Effect of the Invention

According to the present invention, even if noise is superimposed on the output signal from the cam angle sensor, the deteriorating of the accuracy of cylinder distinguishing can be suppressed.

MODE FOR CARRYING OUT THE INVENTION

Embodiments of the present invention will be described below in detail, with reference to the accompanying drawings.

Figure 1:
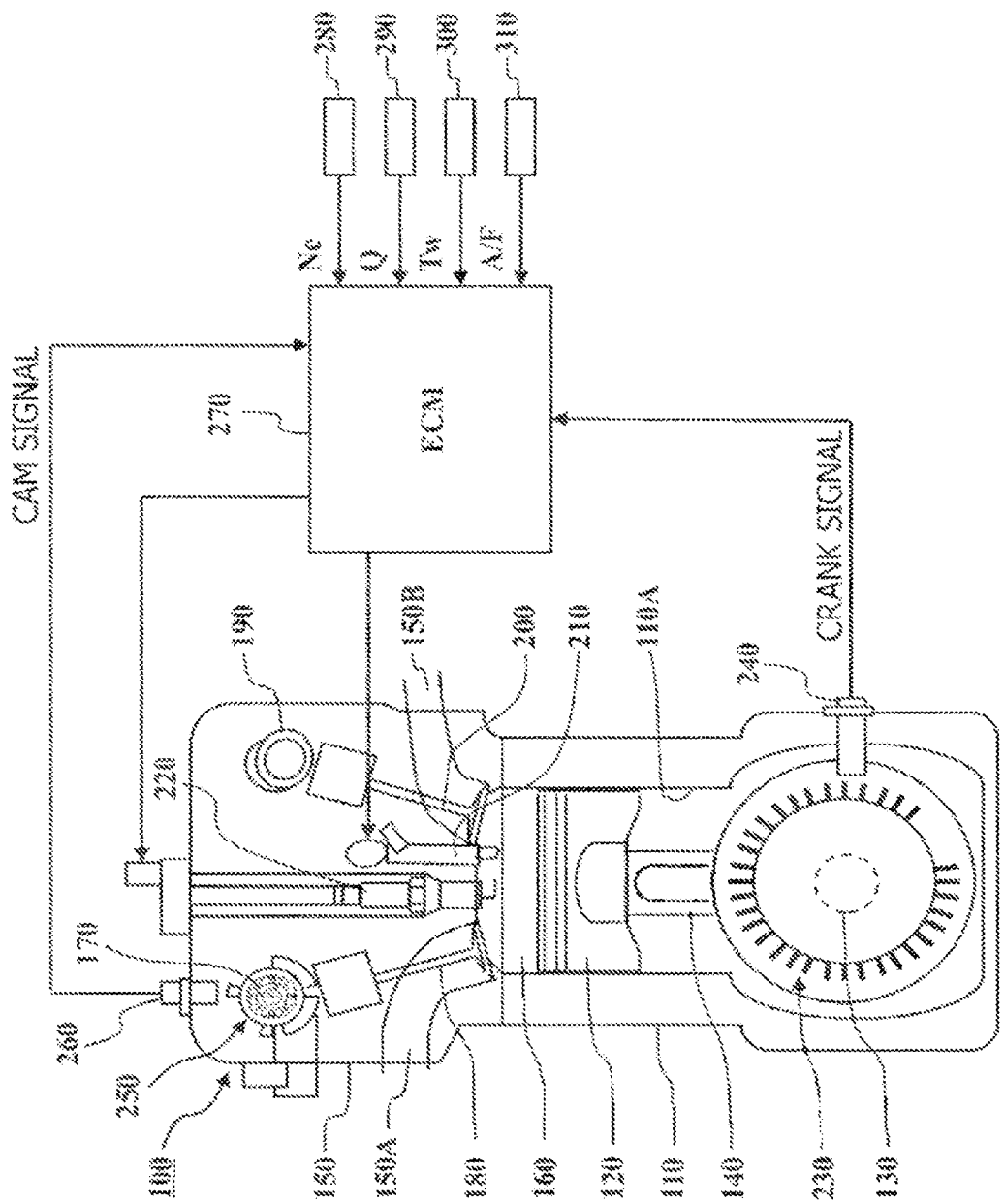
FIG. 1 is a schematic view illustrating one example of a control system of a four-cycle engine.

FIG. 1 illustrates one example of a control system of a four-cycle engine.

An engine 100 includes a cylinder block 110, a piston 120, a crank shaft 130, a connecting rod 140 and a cylinder head 150. In cylinder block 110, a cylinder bore 110A is formed, into which piston 120 is reciprocatably inserted. In a lower portion of cylinder block 110, crank shaft 130 is arranged via a bearing (not shown) so as to be rotatable relatively to cylinder block 110. In addition, piston 120 is connected to crank shaft 130 so as to be relatively rotatable via connecting rod 140.

In cylinder head 150, there are formed an intake port 150A through which intake air is introduced, and an exhaust port 150B through which exhaust gas is discharged, respectively. In addition, by cylinder head 150 being fastened to an upper surface of cylinder block 110, the region functions as a combustion chamber 160, which is partitioned by cylinder bore 110A of cylinder block 110, a crown surface of piston 120, and a lower surface of cylinder head 150. At an opening end of intake port 150A that faces combustion chamber 160, an intake valve 180 is arranged that is driven to open and close by an intake cam shaft 170. In addition, at an opening end of exhaust port 150B facing combustion chamber 160, an exhaust valve 200 is arranged which is driven to open and close by an exhaust cam shaft 190.

To predetermined portions of cylinder head 150 facing combustion chamber 160, there are attached an electromagnetic fuel injection valve 210 for injecting fuel into combustion chamber 160 and an ignition plug 220 for igniting a fuel-air mixture of fuel and intake air, respectively. It should be noted that fuel injection valve 210 is not limited to a structure that directly injects fuel into combustion chamber 160, and it may have a structure that injects fuel into intake port 150A.

Figure 2:
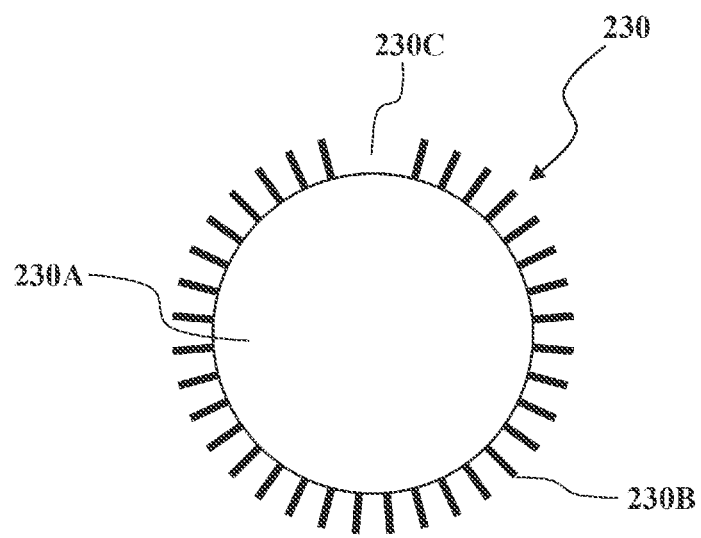
FIG. 2 is a plan view illustrating one example of a crank plate.

A crank plate 230 is attached to an end portion of crank shaft 130. As is illustrated in FIG. 2, crank plate 230 is a member to be detected in which a disk-shaped plate portion 230A, and a plurality of tooth portions 230B that extend radially outward from an outer peripheral end of plate portion 230A at freely chosen predetermined angles, are integrated. In addition, in crank plate 230, a toothless portion 230C that is formed by a cut off part of tooth portion 230B and defines a reference position for every crank angle of 360°. Here, toothless portion 230C is formed by two cut off tooth portions 230B, but toothless portion 230C may be formed by a freely chosen number of cut off tooth portions 230B. In the case of four-cylinder engine 100, crank plate 230 has, when a predetermined angle is set to 6° for example, 58 tooth portions 230B, and toothless portion 230C over 18°, which is formed by two cut off tooth portions 230B. Note that crank plate 230 may have two or more toothless portions 230C.

At a predetermined position which is in a lower portion of cylinder block 110 and faces the outer peripheral end of crank plate 230, a crank angle sensor 240 is attached which detects tooth portion 230B of crank plate 230 and outputs a pulse signal. Accordingly, crank angle sensor 240 outputs crank signals that include an angular position signal for every predetermined angle at which tooth portion 230B is detected, and a reference position signal for every crank angle of 360°, at which toothless portion 230C is detected, with the rotation of crank shaft 130.

Figure 3:
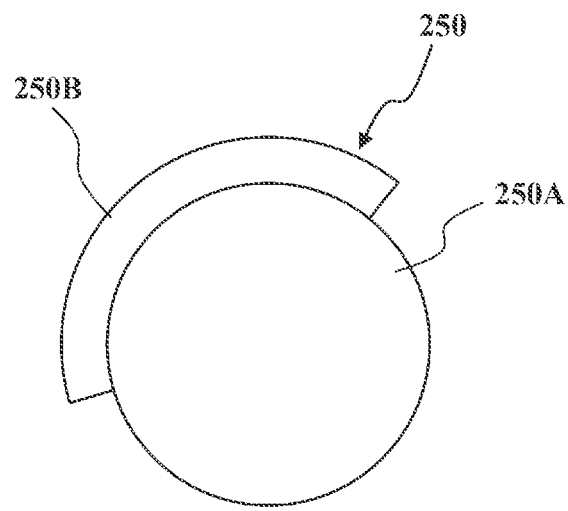
FIG. 3 is a plan view illustrating one example of a cam plate.

At an end portion of intake cam shaft 170, a cam plate 250 is attached. As illustrated in FIG. 3, cam plate 250 is a member to be detected in which a disk-shaped plate portion 250A and an arc-shaped portion to be detected 250B that extends radially outward from a part of an outer peripheral end of plate portion 250A, are integrated.

In addition, at a predetermined portion that is in the upper part of cylinder head 150 and faces an outer peripheral end of cam plate 250, a cam angle sensor 260 is attached that detects portion to be detected 250B of cam plate 250 and outputs a rectangular signal. Portion to be detected 250B of cam plate 250 is attached so that at two toothless positions at which crank angle sensor 240 has detected toothless portion 230C of crank plate 230, while crank shaft 130 rotates twice, cam angle sensor 260 outputs, for example, a LOW signal at a toothless position of the first rotation, and outputs a HIGH signal at a toothless position of the second rotation. Accordingly, cam angle sensor 260 outputs different levels of cam signals, depending on whether or not cam angle sensor 260 has detected portion to be detected 250B of cam plate 250. For this reason, by monitoring such cam signals, the electronic control unit can distinguish whether crank shaft 130 that rotates at a rotation speed twice as high as that of intake cam shaft 170 is in a front reference position which indicates that crank shaft 130 is rotating in the first rotation (0° to 360°) corresponding to 0° to 180° of intake cam shaft 170, or in a rear reference position which indicates that crank shaft 130 is rotating in the second rotation (360° to 720°) corresponding to 180° to 360° of intake cam shaft 170. In short, the electronic control unit can distinguish whether crank shaft 130 is in the front reference position which indicates that crank shaft 130 is rotating in the first rotation, or in the rear reference position which indicates that crank shaft 130 is rotating in the second rotation, while intake cam shaft 170 rotates once. It should be noted that cam plate 250 and cam angle sensor 260 are not limited to being provided on intake cam shaft 170, and they may be provided on exhaust cam shaft 190. In addition, cam plate 250 is not limited to the shape illustrated in FIG. 3, and it may have any shape as long as the cam angle sensor 260 can output different levels of signals between the toothless position of the first rotation and the toothless position of the second rotation.

Crank signals of crank angle sensor 240 and cam signals of cam angle sensor 260 are input into an engine control module (ECM) 270 having a built-in microcomputer. Into ECM 270, in addition to the output signals of crank angle sensor 240 and cam angle sensor 260, output signals are also input, which are output from a rotation speed sensor 280 that detects a rotation speed Ne of engine 100, a load sensor 290 that detects a load Q of engine 100, a water temperature sensor 300 that detects a water temperature Tw of engine 100, and an air-fuel ratio sensor 310 that detects an air-fuel ratio A/F in the exhaust gas. Here, as the load Q of engine 100, a state quantity that closely relates to a required torque can be used, for example, such as an intake flow rate, an intake negative pressure, a supercharging pressure, an accelerator opening degree, and a throttle opening degree. Note that ECM 270 is one example of the electronic control unit.

ECM 270 executes an application program stored in a non-volatile memory of the microcomputer, and thereby electronically controls each of fuel injection valve 210 and ignition plug 220, according to the output signals of crank angle sensor 240, cam angle sensor 260, rotation speed sensor 280, load sensor 290, water temperature sensor 300, and air-fuel ratio sensor 310, in the following way.

ECM 270 reads the rotation speed Ne and the load Q from rotation speed sensor 280 and load sensor 290, respectively, and calculates a basic amount of fuel injection corresponding to an operation state of the engine, based on the rotation speed Ne and the load Q. In addition, ECM 270 reads the water temperature Tw from water temperature sensor 300, and calculates such an amount of fuel injection that the basic fuel injection amount is corrected by the water temperature Tw. Then, ECM 270 outputs a control signal corresponding to the amount of fuel injection into fuel injection valve 210, at a timing corresponding to the operation state of the engine, and allows fuel injection valve 210 to inject fuel into combustion chamber 160. Furthermore, ECM 270 outputs an actuation signal to ignition plug 220 at a timing corresponding to the operation state of the engine after fuel injection, and ignites a fuel-air mixture of fuel and intake air. At this time, ECM 270 reads the air-fuel ratio A/F from air-fuel ratio sensor 310, and feedback-controls fuel injection valve 210 so that the air-fuel ratio A/F in the exhaust air approaches an ideal air-fuel ratio.

When ECM 270 controls engine 100, fuel injection and ignition of each cylinder are performed as described below.

Figure 4:
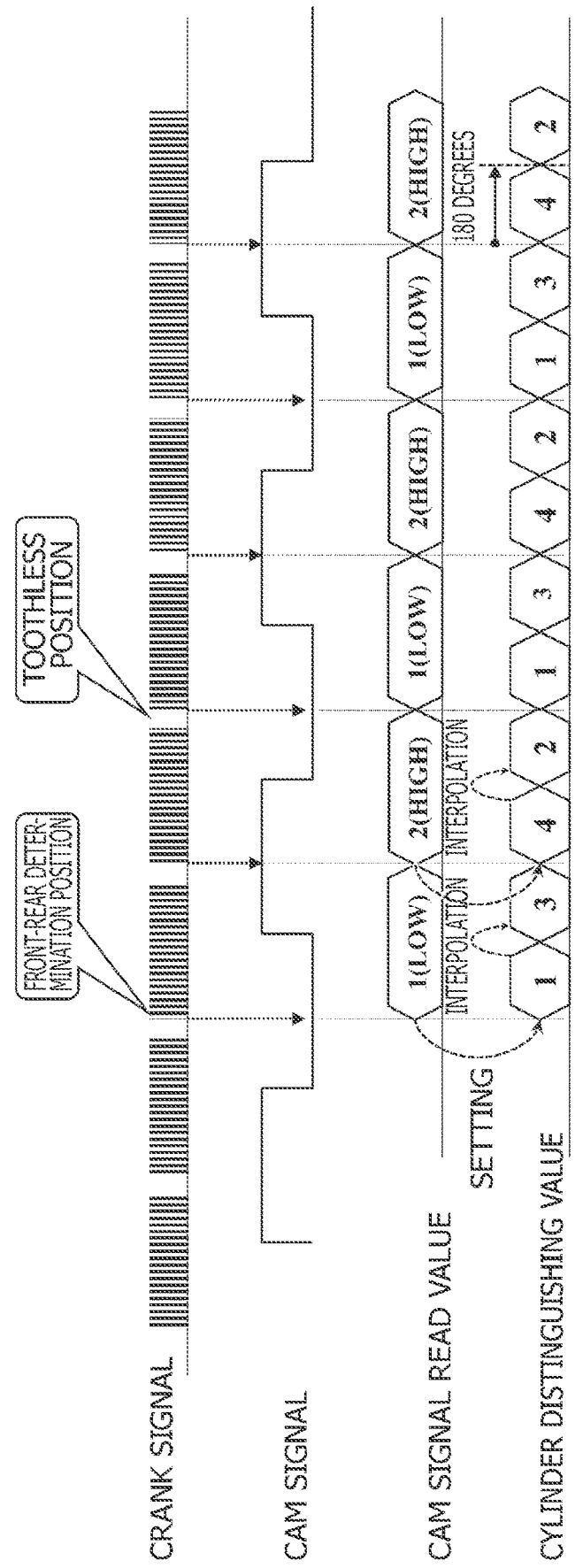
FIG. 4 is an explanatory diagram of a cylinder distinguishing method in a normal state in conventional technology.

As illustrated in FIG. 4, the crank signal of crank angle sensor 240 becomes a pulse-shaped HIGH when tooth portion 230B of crank plate 230 has been detected, and becomes LOW when tooth portion 230B of crank plate 230 has not been detected, in other words, when toothless portion 230C has been detected. On the other hand, in the case in which the cam signal is normal, the cam signal of cam angle sensor 260 becomes HIGH when portion to be detected 250B of cam plate 250 has been detected, and becomes LOW when portion to be detected 250B of cam plate 250 has not been detected. When the toothless position has been detected from a period ratio of the crank signal, the cam signal is read in a subsequent front-rear determination position, and if the cam signal is LOW, a cam signal read value is set to 1 (LOW), and if the cam signal is HIGH, the cam signal read value is set to 2 (HIGH). Then, if the cam signal read value is 1 (LOW), a cylinder distinguishing value is set to "1" that indicates the first cylinder, and after that, when crank shaft 130 rotates 360°, the cylinder distinguishing value is interpolated to "3" that indicates the third cylinder. In addition, if the cam signal read value is 2 (HIGH), the cylinder distinguishing value is set to "4" that indicates the fourth cylinder, and after that, when the crank shaft 130 rotates 360°, the cylinder distinguishing value is interpolated to "2" that indicates the second cylinder. ECM 270 uses the cylinder distinguishing value that has been set in this way, and ECM 270 allows the cylinder to be controlled to inject fuel and ignite the fuel.

Figure 5:
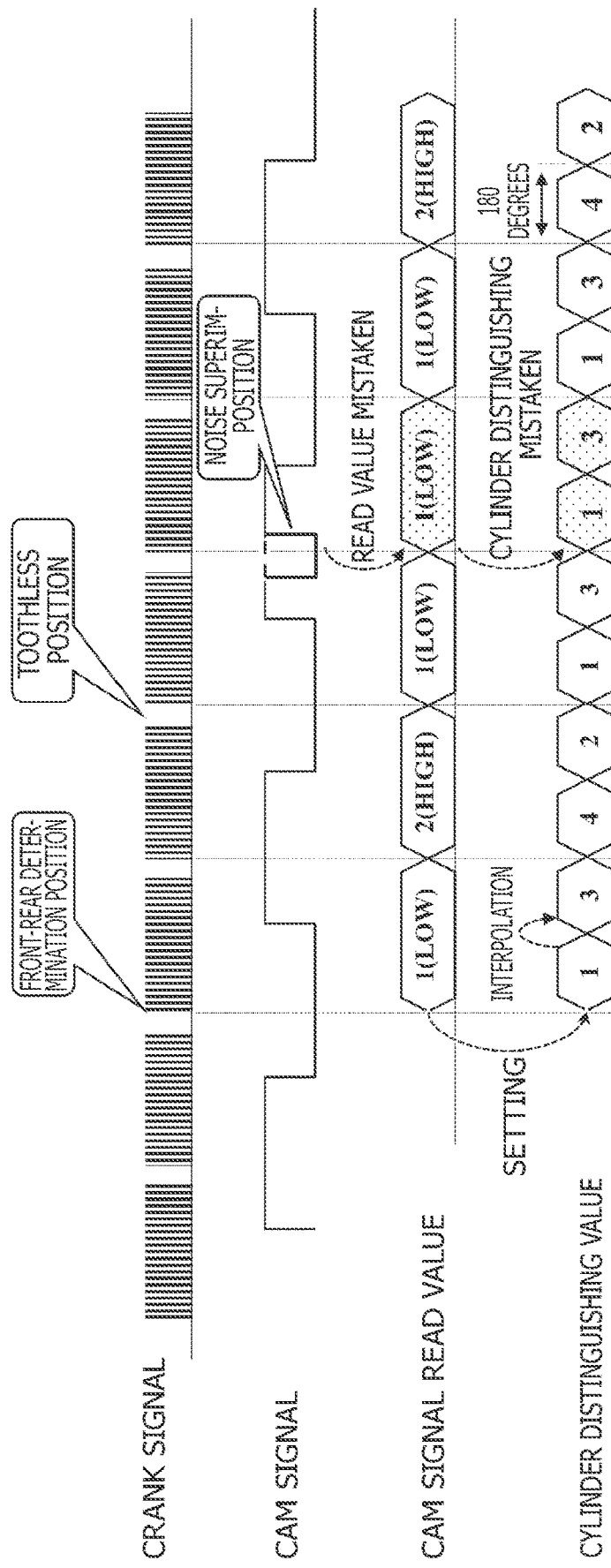
FIG. 5 is an explanatory diagram of a cylinder distinguishing method in an abnormal state in a conventional technology.

In addition, in ignition plug 220, a high voltage that is generated by an ignition device (not shown) flows between a central electrode and the ground electrode, and accordingly, noise tends to be superimposed easily on the cam signal of cam angle sensor 260. For example, as shown in FIG. 5, in a front-rear determination position for determining whether the crank signal is a front reference position or a rear reference position, when noise is superimposed on a cam signal which is to become HIGH, so that the cam signal becomes LOW, the cam signal read value corresponding to the resultant cam signal becomes 1 (LOW). In this case, in the control cycles before and after the noise is superimposed on the cam signal, the cam signal read value does not change, and the cylinder distinguishing value to be set thereafter remains "1". If the fuel injection and the ignition are controlled in such a state, the fuel injection and the ignition may be performed for a cylinder different from a target cylinder, and for example, a decrease in an engine output or the like may result.

Figure 6:
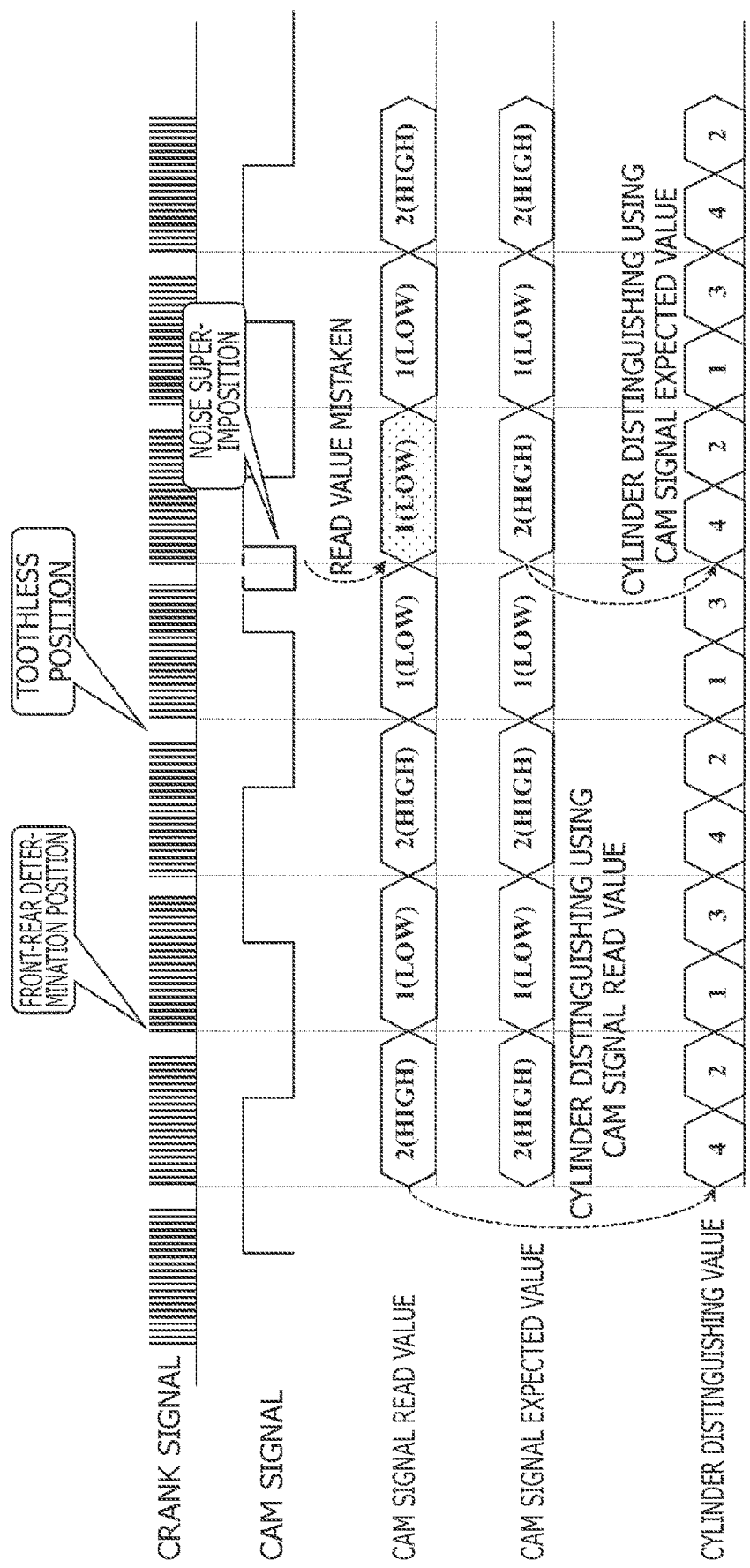
FIG. 6 is an explanatory diagram of a cylinder distinguishing method illustrating an outline of the present embodiment.

Then, attention was paid to a characteristic that in the case in which the cam signal of cam angle sensor 260 is normal, the front and the rear of the cam signal read value are inverted in the front-rear determination position, in other words, 1 (LOW) and 2 (HIGH) are changed alternately, and a cam signal expected value is introduced, which means an expected value of the cam signal (value that is considered to be probably like this), as is illustrated in FIG. 6. Specifically, in order that the cam signal expected value be determined according to the changed state of the cam signal, if the cam signal read value in the control cycle of this time is changed from the cam signal read value in the control cycle of the previous time, the cam signal expected value is set to the cam signal read value. In addition, if the cam signal read value in the control cycle of this time does not change from the cam signal read value in the control cycle of the previous time, the cam signal expected value is set to a value that is inverted from the cam signal expected value in the control cycle of the previous time. Then, if the cam signal read value and the cam signal expected value are equal to each other, ECM 270 distinguishes among the cylinders by using the cam signal read value, and if the cam signal read value and the cam signal expected value are different from each other, ECM 270 determines that the cam signal read value is wrong due to superimposition of noise or the like, and distinguishes among the cylinders by using the cam signal expected value.

By this way, when the cam signal becomes abnormal due to superimposition of noise, ECM 270 distinguishes among the cylinders by using the cam signal expected value in place of the cam signal read value, and accordingly can suppress erroneous cylinder distinguishing. In addition, even if there is an abnormality in the cam signal until cam angle sensor 260 is diagnosed to be definitely faulty, ECM 270 distinguishes among the cylinders by using the cam signal expected value, and accordingly, can enhance robustness concerning the cylinder distinguishing.

Figure 7:
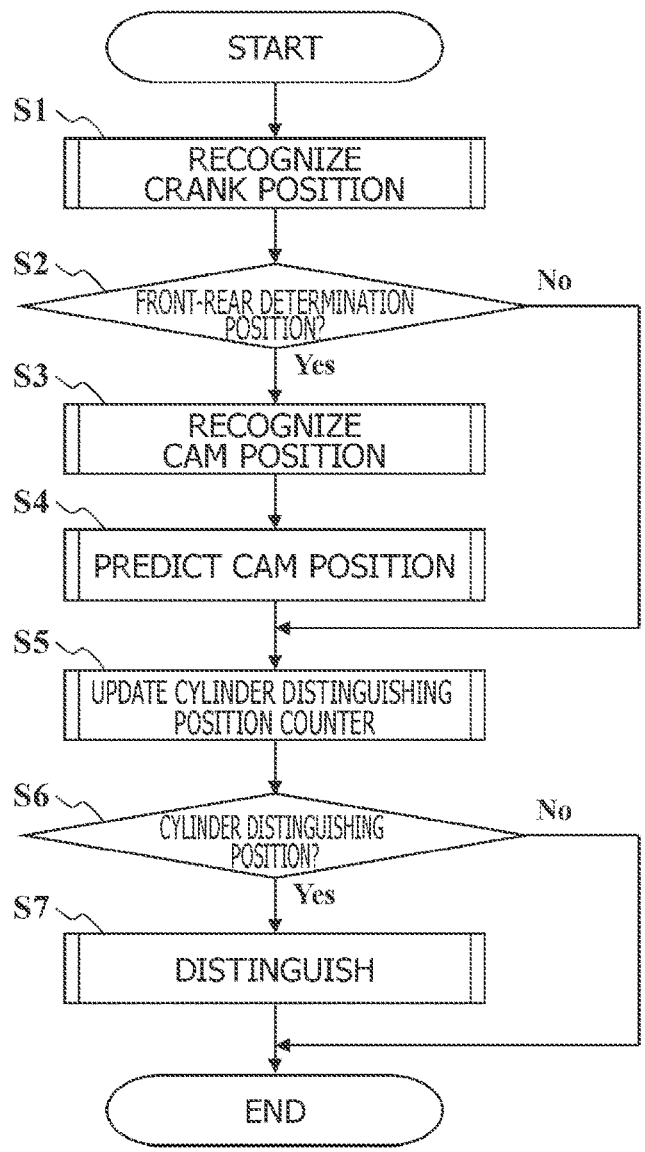
FIG. 7 is a flow chart illustrating one example of a main routine of a cylinder distinguishing process.

FIG. 7 illustrates a main routine of a cylinder distinguishing process which ECM 270 triggered by being activated executes every time when having received the crank signals from crank angle sensor 240, specifically, angular position signals that crank angle sensor 240 has detected tooth portion 230B of crank plate 230. For information, ECM 270 executes the cylinder distinguishing process according to an application program that is stored in a non-volatile memory of the microcomputer.

In a step 1 (abbreviated "S1" in FIG. 7 and the same hereinafter), ECM 270 executes a crank position recognition process in a subroutine format, so as to update a crank position counter that has counted crank signals over one rotation of intake cam shaft 170. Note that in the present embodiment, the crank position recognition process is implemented by the subroutine format, but may be developed in a main routine (hereinafter, the same applies to other subroutines).

In a step 2, ECM 270 determines whether or not the crank position counter is a predetermined value, and thereby determines whether or not the crank position is the front-rear determination position. Here, the front-rear determination position is based on crank shaft 130 rotating twice whereas intake cam shaft 170 rotates once, and means a position at which ECM determines whether the position at the time when intake cam shaft 170 has rotated once is a front reference position at which the rotation of crank shaft 130 is the first rotation, or a rear reference position at which the rotation of crank shaft 130 is the second rotation. Then, if ECM 270 has determined that the position is the front-rear determination position (Yes), the process proceeds to a step 3. On the other hand, if the ECM 270 has determined that the position is not the front-rear determination position (No), the process proceeds to a step 5.

In step 3, ECM 270 executes a cam position recognition process in a subroutine format, so as to set the cam signal read value according to the cam signal sent from cam angle sensor 260, in the front-rear determination position.

In a step 4, ECM 270 executes a cam position prediction process in a subroutine format, so as to select a cam signal setting value that is used for the cylinder distinguishing in the front-rear determination position. After that, ECM 270 advances the process to step 5.

In step 5, ECM 270 executes an updating process of a cylinder distinguishing position counter in a subroutine format, so as to update the cylinder distinguishing position counter that has counted the crank signals over one rotation of crank shaft 130.

In a step 6, ECM 270 determines whether or not the cylinder distinguishing position counter is a predetermined value, and thereby determines whether or not the position is the cylinder distinguishing position for distinguishing the cylinder of engine 100. Then, if ECM 270 has determined that the position is the cylinder distinguishing position (Yes), the process proceeds to a step 7. On the other hand, if ECM 270 determines that the position is not the cylinder distinguishing position (No), ECM 270 ends the cylinder distinguishing process.

In step 7, ECM 270 executes the distinguishing process in a subroutine format, so as to actually distinguish among the cylinders. After that, ECM 270 ends the cylinder distinguishing process.

According to such a cylinder distinguishing process, when the position has become a front-rear determination position specified by counting of the crank signals, the cam signal read value is set according to the cam signal, and also, an abnormality counter is updated and a cam signal selection value is selected according to a changed state of the cam signal read value. Then, when the position has become the cylinder distinguishing position specified by counting of the crank signals, the cylinder distinguishing value is set according to the cam signal selection value.

Figure 8:
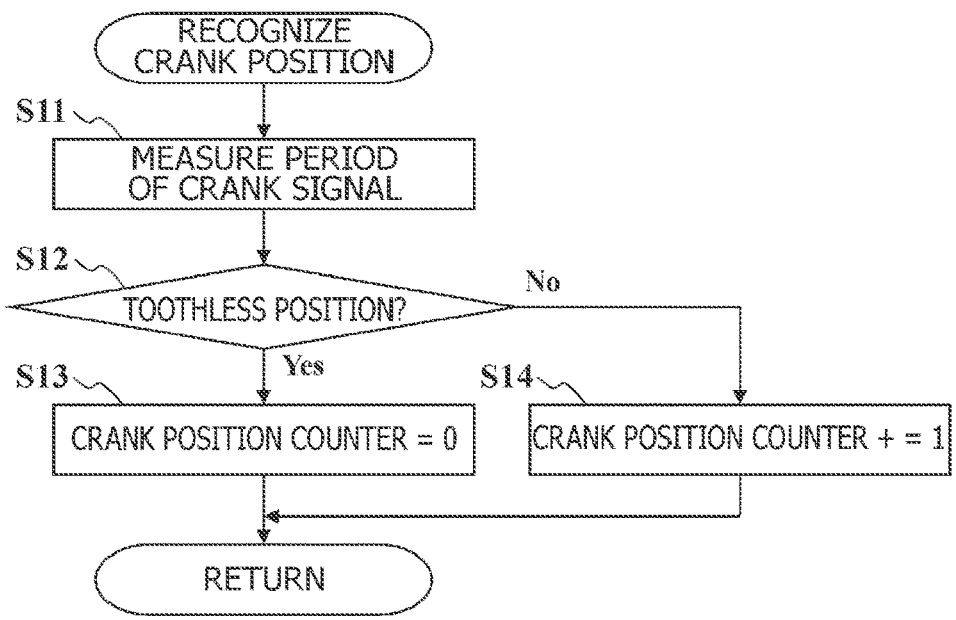
FIG. 8 is a flow chart illustrating one example of a crank position recognition process in a subroutine format.

FIG. 8 illustrates one example of a crank position recognition process in a subroutine format.

In a step 11, ECM 270 measures a time interval between the reference position signals of two consecutive crank signals output from crank angle sensor 240, and thereby measures a period of the crank signals.

In a step 12, ECM 270 determines whether or not the position is a toothless position corresponding to toothless portion 230C of crank plate 230, based on a ratio between periods of two consecutive crank signals. Then, if ECM 270 has determined that the position is the toothless position (Yes), the process proceeds to a step 13. On the other hand, if ECM 270 has determined that the position is not the toothless position (No), the process proceeds to a step 14.

In step 13, ECM 270 sets "0" to the crank position counter and resets the counter. After that, ECM 270 ends the crank position recognition process.

In step 14, ECM 270 adds "1" to the crank position counter and updates the counter. After that, ECM 270 ends the crank position recognition process.

According to the crank position recognition process, ECM 270 measures the period of the crank signals of crank angle sensor 240, and determines whether or not the position is the toothless position based on the ratio between the periods of two consecutive crank signals. Then, if the position is the toothless position, ECM 270 sets "0" to the crank position counter, and resets the counter. In addition, if the position is not the toothless position, ECM 270 adds "1" to the crank position counter, and updates the counter. Thus, ECM 270 counts the crank signals over one rotation of intake cam shaft 170.

Figure 9:
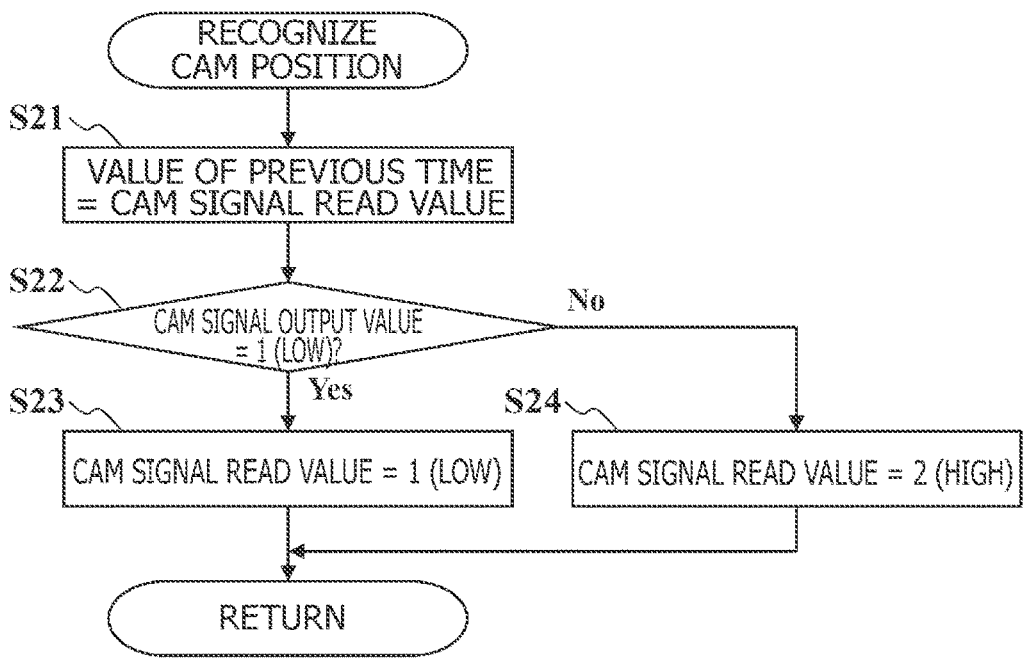
FIG. 9 is a flow chart illustrating one example of a cam position recognition process in a subroutine format.

FIG. 9 illustrates one example of the cam position recognition process in the subroutine format.

In a step 21, ECM 270 sets the cam signal read value in the control cycle of this time, to a variable (value of previous time) which holds an output value of cam angle sensor 260 in the control cycle of the previous time. It should be noted that in an initialization process at the time when ECM 270 starts, for example, an output value of cam angle sensor 260 in a finalizing process of the previous time is set to the cam signal read value.

In a step 22, ECM 270 reads the cam signal from cam angle sensor 260, and determines whether or not the cam signal output value is LOW, in other words, whether or not a portion to be detected 250B of cam plate 250 has been detected. Then, if ECM 270 has determined that the cam signal output value is LOW (Yes), the process proceeds to a step 23. On the other hand, if ECM 270 has determined that the cam signal output value is not LOW, in other words, a portion to be detected 250B of cam plate 250 is detected (No), the process proceeds to a step 24.

In step 23, ECM 270 sets "1 (LOW)" to the cam signal read value. After that, ECM 270 ends the cam position recognition process.

In step 24, ECM 270 sets "2 (HIGH)" to the cam signal read value. After that, ECM 270 ends the cam position recognition process.

According to the cam position recognition process, ECM 270 stores the cam signal read value in the control cycle of the previous time, and also sequentially updates the cam signal read value according to the cam signal.

Figure 10:
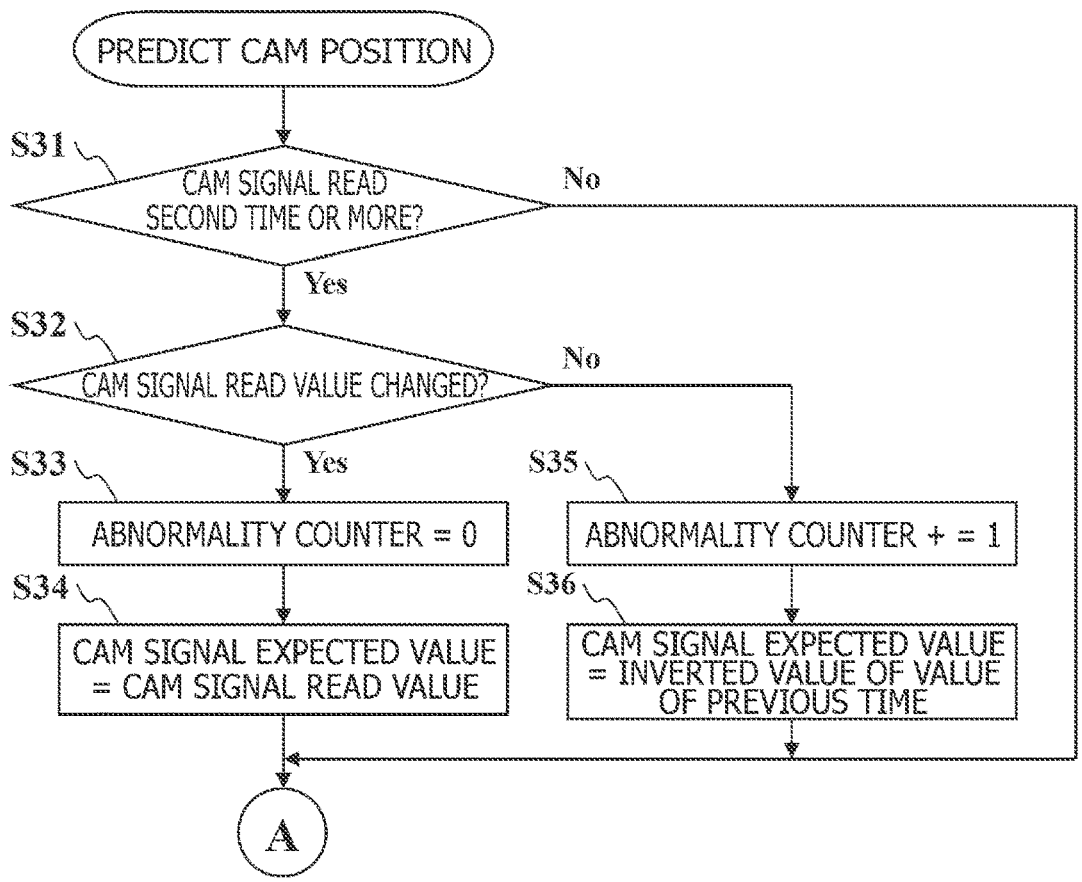
FIG. 10 is a flow chart illustrating one example of a cam position prediction process in a subroutine format.
Figure 11:
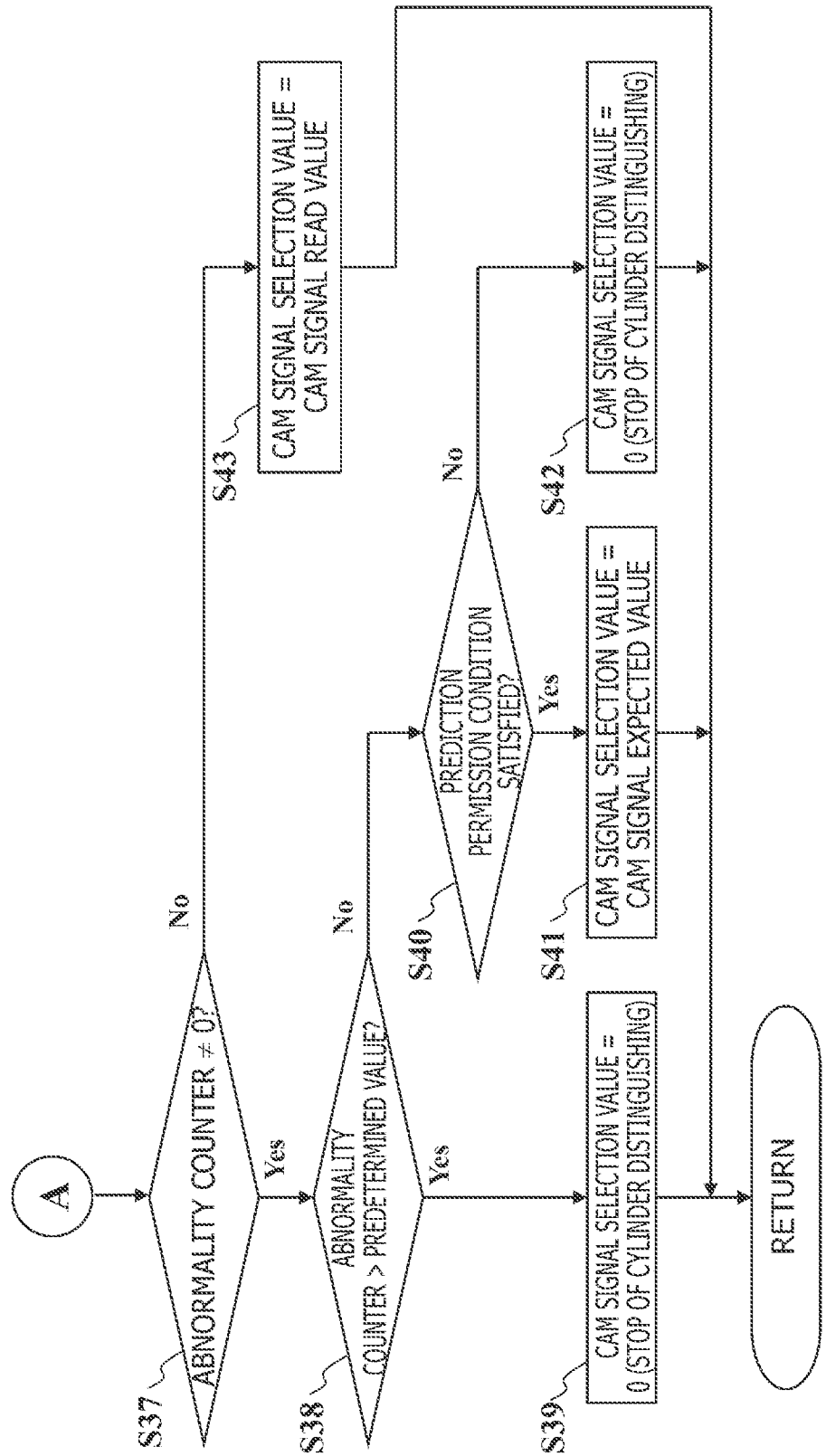
FIG. 11 is a flow chart illustrating one example of the cam position prediction process in a subroutine format.

FIG. 10 and FIG. 11 illustrate one example of a cam position prediction process in a subroutine format.

In a step 31, ECM 270 determines whether or not the cam signals of the second time or later are read from cam angle sensor 260, in other words, whether or not a value of the previous time is set. Then, if ECM 270 has determined that the cam signals of the second time or later are read (Yes), the process proceeds to a step 32. On the other hand, if the ECM 270 determines that the cam signals of the second time or later are not read, in other words, the value of the previous time is not set (No), the process proceeds to a step 37.

In step 32, ECM 270 determines whether or not the cam signal read value has changed from the control cycle of the previous time, in other words, whether or not the value of the previous time and the cam signal read value are "1 (LOW)" and "2 (HIGH)" or "2 (HIGH)" and "1 (LOW)". Then, if ECM 270 has determined that the cam signal read value has changed (Yes), the process proceeds to a step 33. On the other hand, if ECM 270 has determined that the cam signal read value does not change (No), the process proceeds to a step 35.

In step 33, ECM 270 determines that the cam signal read value is normal, and it sets "0" to an abnormality counter which counts the number of such occasions that the cam signal read value has consecutively caused abnormality, and resets the counter.

In a step 34, the cam signal read value is normal, and accordingly, ECM 270 sets the cam signal read value to the cam signal expected value. After that, ECM 270 advances the process to step 37.

In a step 35, ECM 270 determines that the cam signal read value is abnormal, adds 1 to the abnormality counter, and updates the counter.

In a step 36, the cam signal read value is abnormal, and accordingly, ECM 270 sets an inverted value of the cam signal expected value of the previous time, in other words, "2 (HIGH)" when the cam signal expected value of the previous time is "1 (LOW)", and "1 (LOW)" when the cam signal expected value of the previous time is "2 (HIGH)", at the cam signal expected value. After that, ECM 270 advances the process to step 37.

In step 37, ECM 270 determines whether or not the abnormality counter is not "0", in other words, whether or not the cam signal read value is abnormal. Then, if ECM 270 has determined that the abnormality counter is not "0" (Yes), the process proceeds to a step 38. On the other hand, if ECM 270 has determined that the abnormality counter is "0" (No), the process proceeds to a step 43.

In step 38, ECM 270 determines whether or not the abnormality counter is greater than a predetermined value, in other words, whether or not a failure has occurred in cam angle sensor 260. Then, if ECM 270 has determined that the abnormality counter is greater than the predetermined value (Yes), the process proceeds to a step 39. On the other hand, if ECM 270 determines that the abnormality counter is not greater than the predetermined value, in other words, the abnormality counter is the predetermined value or less (No), the process proceeds to a step 40.

In step 39, ECM 270 determines that a failure has occurred in cam angle sensor 260, and selects "0 (stop of cylinder distinguishing)" as the cam signal selection value serving as a variable that is used for the cylinder distinguishing. After that, ECM 270 ends the cam position prediction process. It should be noted that when cam angle sensor 260 has been diagnosed to be faulty, ECM 270 can distinguish among cylinders by counting only the crank signals without using the cam signal.

In step 40, ECM 270 determines whether or not a prediction permission condition is satisfied. Then, if ECM 270 has determined that the prediction permission condition is satisfied (Yes), the process proceeds to a step 41. On the other hand, if ECM 270 has determined that the prediction permission condition is not satisfied (No), the process proceeds to a step 42. Here, at least one of the following conditions can be used as the prediction permission condition. Note that the prediction permission condition can also be at least one of a condition that the cam signal has been gone through the front-rear determination more than once, and a condition that the rotation speed Ne of engine 100 is a predetermined rotation speed or greater.

Condition 1: the cam signal read value is consecutively normal a predetermined number of times or more, and the cylinder distinguishing value does not become "0". Here, whether or not the cam signal read value is normal can be determined based on whether the cam signal becomes alternately "1 (LOW)" and "2 (HIGH)". In addition, the predetermined number of times may be a freely chosen number of times of 2 or more. The reason such a condition is set is that when the cam signal read value is consecutively normal, it can be determined that ECM 270 can correctly recognize the front and rear of intake cam shaft 170.

Condition 2: the state in which the rotation speed Ne of engine 100 is a predetermined value or greater continues for a predetermined time or longer, and crank shaft 130 is not rotating in the reverse direction. The reason such a condition is set is that there is a concern that ECM 270 may wrongly detect toothless portion 230C of crank plate 230 due to reverse rotation or changes of rotation, at the time of low rotation in which the rotation speed Ne of engine 100 is less than a predetermined value.

Condition 3: the number of crank signals before ECM 270 detects toothless portion 230C of crank plate 230 is a first predetermined value or greater and a second predetermined value or less. Here, the first predetermined value can be set to 0 to $N_{CRA}-1$ ($N_{CRA}$: expected value of crank signal from toothless portion 230C to next toothless portion 230C), and the second predetermined value can be set to $N_{CRA}$ to $2N_{CRA}-1$. The reason such a condition is set is that when the number of crank signals is small before ECM 270 detects toothless portion 230C, it is considered that ECM 270 has erroneously detected toothless portion 230C due to abnormality of the crank signal. In this case, the toothless position is not correct, and accordingly, the cylinder distinguishing is stopped. In addition, the reason is considered to be because when the number of crank signals is large before ECM 270 detects toothless portion 230C, it is considered that ECM 270 could not detect toothless portion 230C. The reason is because, for example, when ECM 270 has not been capable of detecting toothless portion 230C only once, it is correct that the next cam signal read value is equal to the value of the previous time, and ECM 270 is in error when having used the predicted value.

Condition 4: crank angle sensor 240 and cam angle sensor 260 are normal. If these sensors are abnormal, ECM 270 cannot accurately distinguish among the cylinders, and accordingly, it is necessary to prohibit the cam position prediction process.

In step 41, ECM 270 determines that the cam signal read value is normal because the prediction permission condition is satisfied, and it selects the cam signal expected value as the cam signal setting value. After that, ECM 270 ends the cam position prediction process.

In step 42, ECM 270 determines that there is a possibility that the cam signal read value is abnormal because the prediction permission condition is not satisfied, and selects "0 (stop of cylinder distinguishing)" as the cam signal selection value. After that, ECM 270 ends the cam position prediction process.

In step 43, ECM 270 determines that cam angle sensor 260 is normal because the abnormality counter is 0, and selects the cam signal read value as the cam signal selection value. After that, ECM 270 ends the cam position prediction process.

According to the cam position prediction process, ECM 270 determines whether or not the cam signal read value has changed from the control cycle of the previous time on condition that the cam signals of the second time or later are read, and thereby determines whether or not the cam signal read value is normal. Then, if the cam signal read value is normal, ECM 270 resets the abnormality counter, and also selects the cam signal read value as the cam signal expected value. In addition, if the cam signal read value is abnormal, ECM 270 adds "1" to the abnormality counter, and it updates the abnormality counter; and it also selects an inverted value of the cam signal expected value in the control cycle of the previous time, as the cam signal expected value. After that, when the abnormality counter has reached a predetermined value, in other words, when a state in which the cam signal does not change has occurred consecutively a predetermined number of times, ECM 270 determines that a failure has occurred in cam angle sensor 260, and selects "0", which indicates that the cylinder distinguishing should be stopped, as the cam signal selection value. In addition, if the prediction permission condition is satisfied in a state in which the abnormality counter does not reach the predetermined value, ECM 270 selects the cam signal expected value as the cam signal selection value, and if the prediction permission condition is not satisfied in a state in which the abnormality counter does not reach the predetermined value, it selects "0", which indicates that the cylinder distinguishing should be stopped, as the cam signal selection value. Furthermore, if the abnormality counter is "0", ECM 270 selects the cam signal read value as the cam signal selection value.

Figure 12:
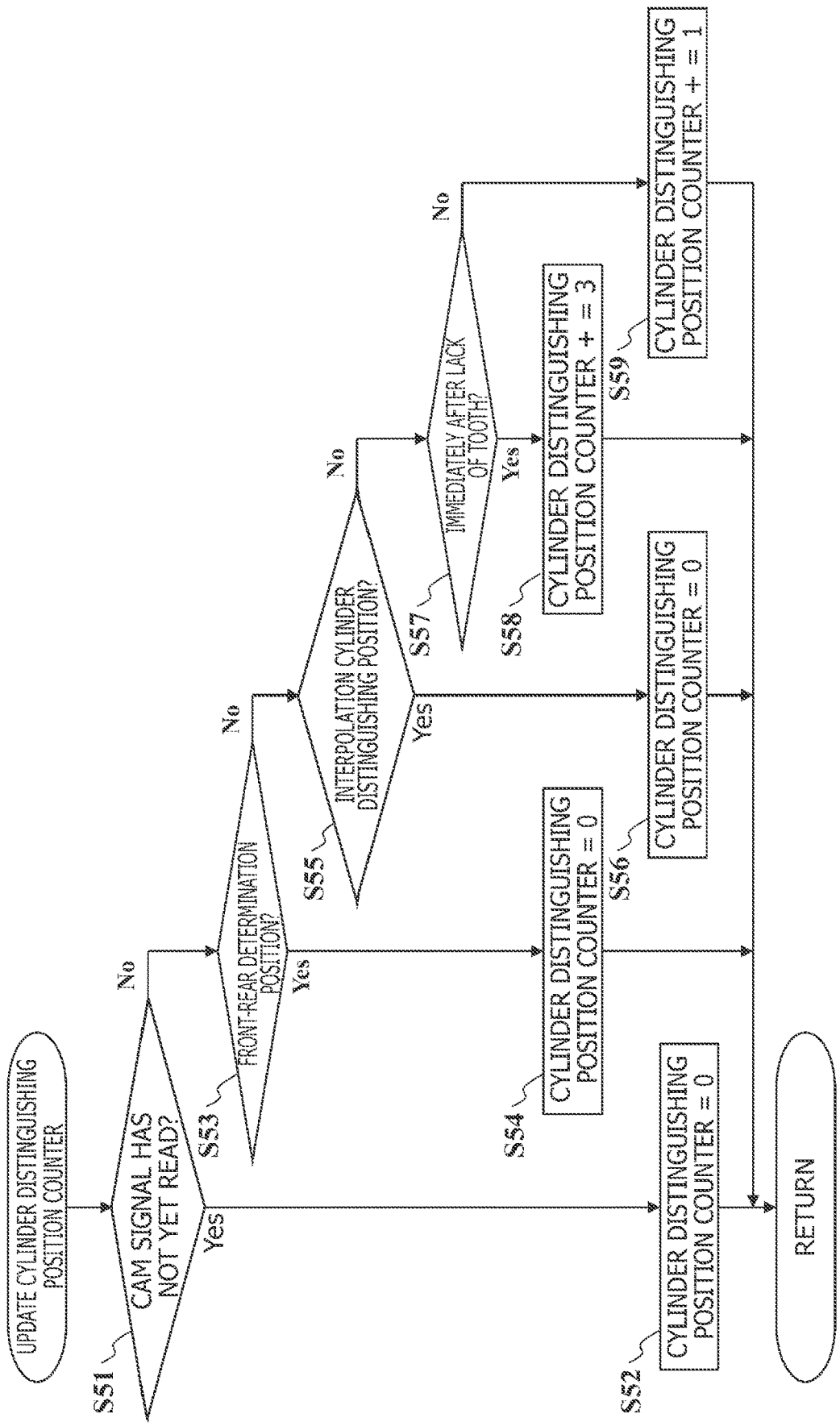
FIG. 12 is a flow chart illustrating one example of an updating process of a cylinder distinguishing position counter, in a subroutine format.

FIG. 12 illustrates one example of an updating process of the cylinder distinguishing position counter, in a subroutine format.

In a step 51, ECM 270 determines whether or not the cam signal from cam angle sensor 260 has not yet been read. Then, if ECM 270 has determined that the cam signal has not yet been read (Yes), the process proceeds to a step 52. On the other hand, if ECM 270 has determined that the cam signal has already been read (No), the process proceeds to a step 53.

In step 52, ECM 270 sets "0" to the cylinder distinguishing position counter that has counted the crank signals over one rotation of crank shaft 130, and resets the cylinder distinguishing position counter. After that, ECM 270 ends the updating process of the cylinder distinguishing position counter.

In step 53, ECM 270 determines whether or not the position has become the front-rear determination position. Then, if ECM 270 has determined that the position has become the front-rear determination position (Yes), the process proceeds to a step 54. On the other hand, if ECM 270 has determined that the position has not become the front-rear determination position (No), the process proceeds to a step 55.

In step 54, ECM 270 sets "0" to the cylinder distinguishing position counter and resets the counter. After that, ECM 270 ends the updating process of the cylinder distinguishing position counter.

In step 55, ECM 270 determines whether or not the cylinder distinguishing position counter has become a predetermined value, and thereby determines whether or not the position has become an interpolation cylinder distinguishing position. Here, the interpolation cylinder distinguishing position refers to a position that can pinpoint the timing at which crank shaft 130 has been shifted from the front rotation to the rear rotation with the rotation of intake cam shaft 170, at the interpolation cylinder distinguishing position, cam angle sensor 260 cannot detect the timing. In addition, in the case of crank plate 230 which has been described with reference to FIG. 2, "29" can be set to the predetermined value because the rear cylinder distinguishing position appears at the crank signal of the 30th time. Then, if ECM 270 has determined that the position has become the interpolation cylinder distinguishing position (Yes), the process proceeds to a step 56. On the other hand, if ECM 270 has determined that the position has not become the interpolation cylinder distinguishing position (No), the process proceeds to a step 57.

In step 56, the position becomes the interpolation cylinder distinguishing position, and accordingly, ECM 270 sets "0" to the cylinder distinguishing position counter, and resets the counter. After that, ECM 270 ends the updating process of the cylinder distinguishing position counter.

In step 57, ECM 270 determines whether or not the crank signal from crank angle sensor 240 is a signal right after the toothless position. Then, if ECM 270 has determined that the crank signal is the signal right after the toothless position (Yes), the process proceeds to a step 58. On the other hand, if ECM 270 has determined that the crank signal is not the signal right after the toothless position (No), the process proceeds to a step 59.

In step 58, ECM 270 adds "3" to the cylinder distinguishing position counter in consideration of the number of missing teeth (two teeth) in toothless portion 230C of crank plate 230, and updates the counter. After that, ECM 270 ends the updating process of the cylinder distinguishing position counter.

In step 59, ECM 270 adds "1" to the cylinder distinguishing position counter, and updates the counter. After that, ECM 270 ends the updating process of the cylinder distinguishing position counter.

According to such an updating process of the cylinder distinguishing position counter, if the cam signal from cam angle sensor 260 has not yet been read, ECM 270 resets the cylinder distinguishing position counter as an initialization process. In addition, when the cam signal from cam angle sensor 260 has already been read, and the position becomes the front-rear determination position, ECM 270 resets the cylinder distinguishing position counter. When the position does not become the front-rear determination position but the position becomes the interpolation cylinder distinguishing position, ECM 270 resets the cylinder distinguishing position counter. When the position does not become the interpolation cylinder distinguishing position but the crank signal from crank angle sensor 240 is a signal right after the missing tooth, ECM 270 adds "3" to the cylinder distinguishing position counter, and updates the counter. When the position does not become the interpolation cylinder distinguishing position and the crank signal from crank angle sensor 240 is not a signal right after the missing tooth, ECM 270 adds "1" to the cylinder distinguishing position counter, and updates the counter. Thus, ECM 270 appropriately updates the cylinder distinguishing position counter.

Figure 13:
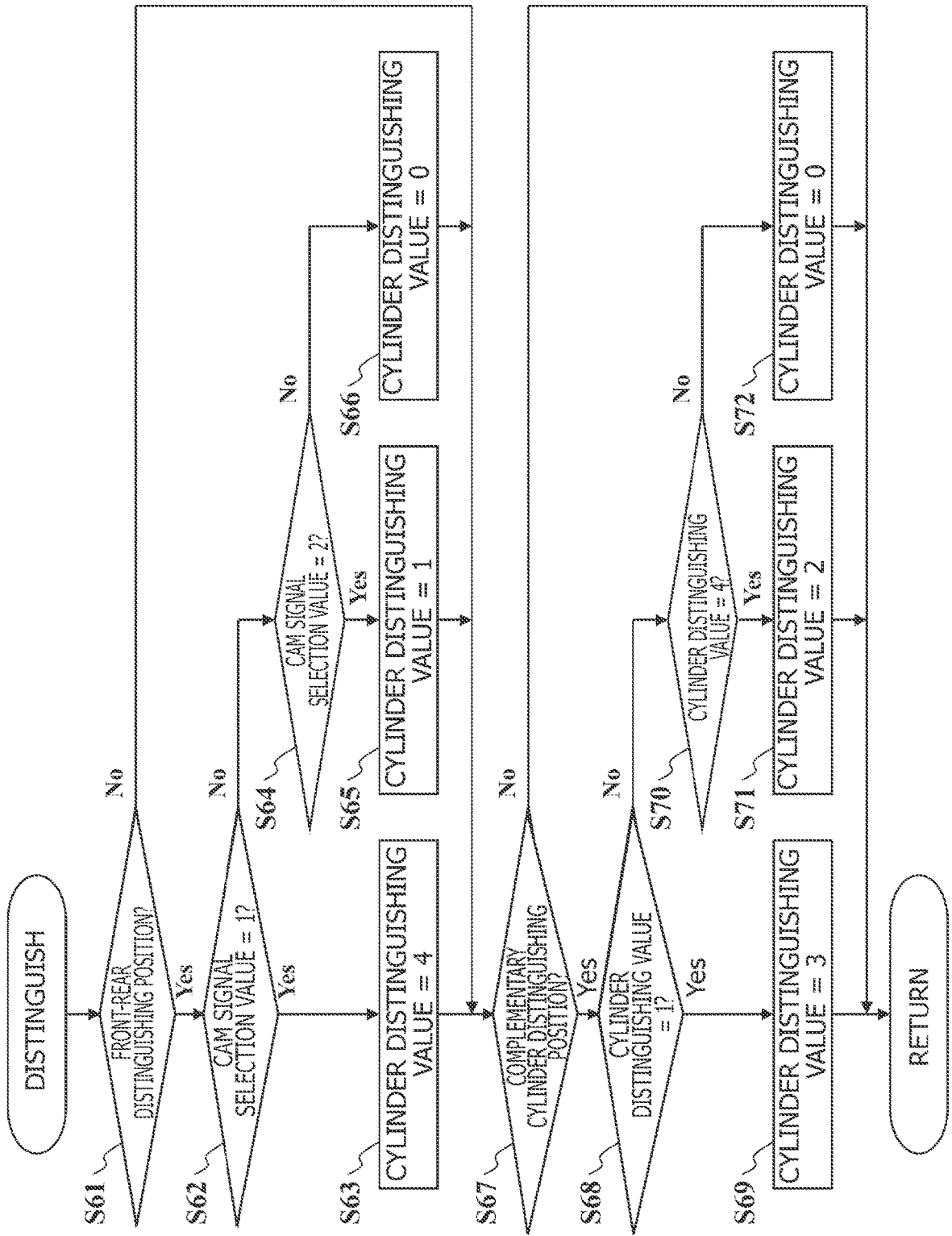
FIG. 13 is a flow chart illustrating one example of a distinguishing process in a subroutine format.

FIG. 13 illustrates one example of a distinguishing process in a subroutine format.

In a step 61, ECM 270 determines whether or not the crank position counter has become a predetermined value, and thereby determines whether or not the crank position is the front-rear determination position. Then, if ECM 270 has determined that the position is the front-rear determination position (Yes), the process proceeds to a step 62. On the other hand, if ECM 270 has determined that the position is not the front-rear determination position (No), the process proceeds to a step 67.

In step 62, ECM 270 determines whether or not the cam signal selection value is "LOW (1)". Then, if ECM 270 has determined that the cam signal selection value is "LOW (1)" (Yes), the process proceeds to a step 63. On the other hand, if ECM 270 has determined that the cam signal selection value is not "LOW (1)" (No), the process proceeds to a step 64.

In step 63, ECM 270 sets "4" which indicates a fourth cylinder, to the cylinder distinguishing value serving as a variable for holding the cylinder distinguishing result. After that, ECM 270 advances the process to step 67.

In step 64, ECM 270 determines whether or not the cam signal selection value is "HIGH (2)". Then, if ECM 270 has determined that the cam signal selection value is "HIGH (2)", the process proceeds to a step 65. On the other hand, if ECM 270 determines that the cam signal selection value is not "HIGH (2)", in other words, is neither "LOW (1)" nor "HIGH (2)" (No), the process proceeds to a step 66.

In step 65, ECM 270 sets "1", which indicates a first cylinder, to the cylinder distinguishing value. After that, ECM 270 advances the process to step 67.

In step 66, ECM 270 sets "0", which indicates that the cylinder is unknown, to the cylinder distinguishing value. In other words, because the cam signal for the cylinder distinguishing in the front-rear determination position is not "1 (LOW)" or "2 (HIGH)", ECM 270 determines that, for example, noise is superimposed on the signal, and sets "0" to the cylinder distinguishing value so as to prevent inappropriate control. After that, ECM 270 advances the process to step 67.

In step 67, ECM 270 determines whether or not the cylinder distinguishing position counter has become a predetermined value, and thereby determines whether or not the position is the interpolation cylinder distinguishing position. Then, if ECM 270 has determined that the position is the interpolation cylinder distinguishing position (Yes), the process proceeds to a step 68. On the other hand, if ECM 270 determines that the position is not the interpolation cylinder distinguishing position (No), ECM 270 does not need to distinguish among the cylinders, and accordingly, ends the distinguishing process.

In step 68, ECM 270 determines whether or not the cylinder distinguishing value is "1", in other words, whether or not the reference position of the crank signal is the front position. Then, if ECM 270 has determined that the cylinder distinguishing value is "1" (Yes), the process proceeds to a step 69. On the other hand, if ECM 270 has determined that the cylinder distinguishing value is not "1" (No), the process proceeds to a step 70.

In step 69, because the position is the interpolation cylinder distinguishing position in the front position, ECM 270 sets "3" which indicates a third cylinder, to the cylinder distinguishing value, and performs interpolation. After that, ECM 270 ends the distinguishing process.

In step 70, ECM 270 determines whether or not the cylinder distinguishing value is "4", in other words, whether or not the reference position of the crank signal is a rear position. Then, if ECM 270 has determined that the cylinder distinguishing value is "4" (Yes), the process proceeds to a step 71. On the other hand, if ECM 270 has determined that the cylinder distinguishing value is not "4" (No), the process proceeds to a step 72.

In step 71, because the position is the interpolation cylinder distinguishing position in the rear position, ECM 270 sets "2", which indicates a second cylinder, to the cylinder distinguishing value, and performs interpolation. After that, ECM 270 ends the distinguishing process.

In step 72, the cylinder distinguishing value at the interpolation cylinder distinguishing position is not "1" or "4"; and accordingly, ECM 270 determines, for example, that there is a possibility that noise is superimposed on the cylinder distinguishing value, and sets "0", which indicates that the cylinder distinguishing is unknown, to the cylinder distinguishing value. After that, ECM 270 ends the distinguishing process.

According to such a distinguishing process, when the cam signal selection value is "LOW (1)" in the front-rear determination position, ECM 270 sets "4", which indicates the fourth cylinder, to the cylinder distinguishing value. When the cam signal selection value is "HIGH (2)" in the front-rear determination position, ECM 270 sets "1", which indicates the first cylinder, to the cylinder distinguishing value. When the cam signal selection value is neither "LOW (1)" nor "HIGH (2)" in the front-rear determination position, ECM 270 sets "0", which indicates that the cylinder is unknown, to the cylinder distinguishing value.

In addition, if the cylinder distinguishing value is "1" in the interpolation cylinder distinguishing position, ECM 270 sets "3", which indicates a third cylinder following the first cylinder, to the cylinder distinguishing value, and performs interpolation. If the cylinder distinguishing value is "4" in the interpolation cylinder distinguishing position, ECM 270 sets "2", which indicates that the cylinder is a second cylinder following the fourth cylinder, to the cylinder distinguishing value, and performs interpolation. If the cylinder distinguishing value is neither "1" nor "4" in the interpolation cylinder distinguishing position, ECM 270 sets "0", which indicates that the cylinder is unknown, to the cylinder distinguishing value.

Here, an action of the present embodiment will be described assuming a plurality of embodiments in which the cam signal or the crank signal has become abnormal and how they are addressed. It should be noted that for convenience of description, it is assumed that the cam signal is normal in the initial state, and the front-rear determination position is a position at which the crank signal has appeared after the toothless position has been detected. However, the front-rear determination position may be a freely chosen timing after the toothless position has been detected.

First Embodiment

Figure 14:
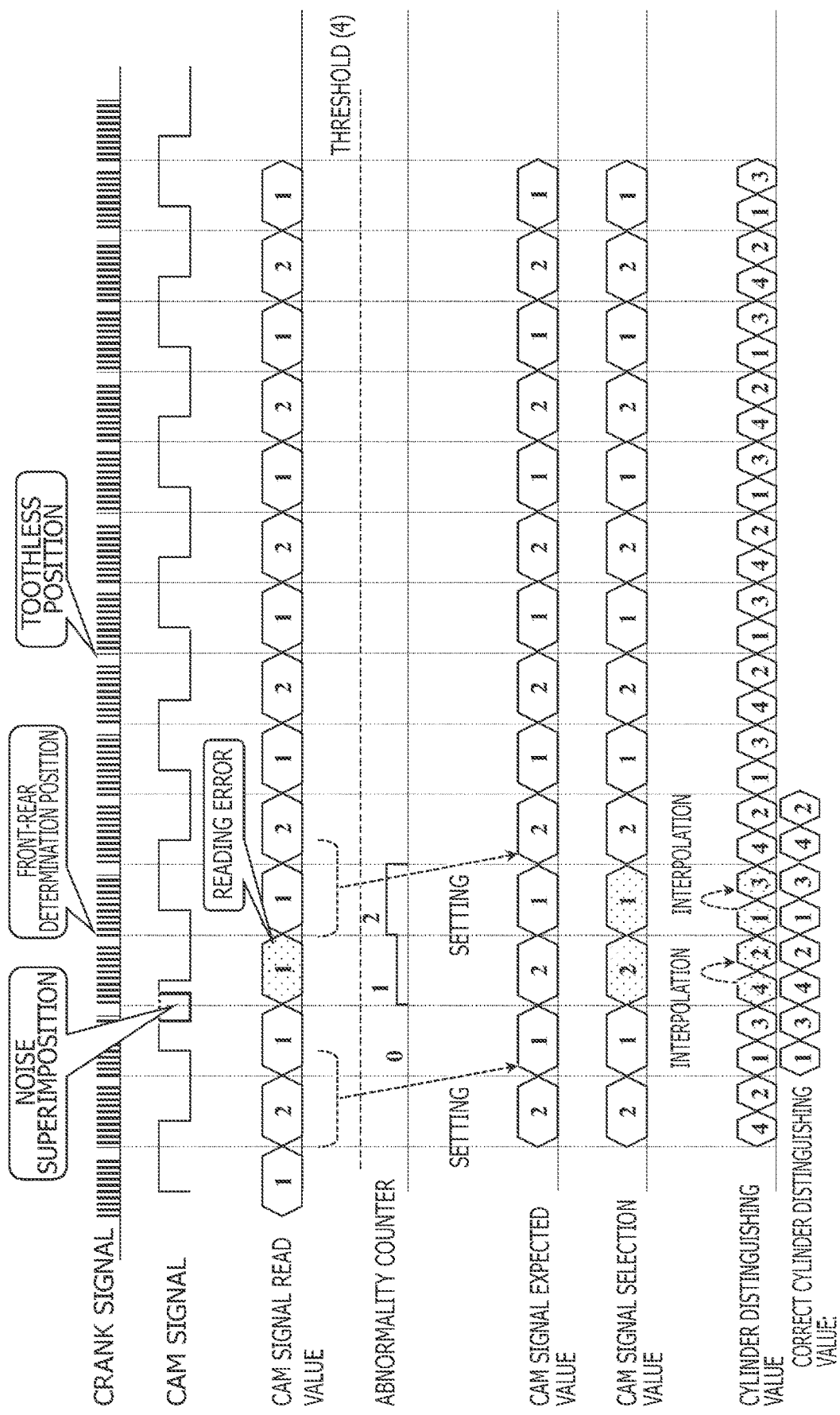
FIG. 14 is an explanatory diagram of an embodiment in which the cam signal becomes abnormal in a single event in a four-cylinder engine.

FIG. 14 illustrates an embodiment in which the cam signal has become abnormal in a single event.

When the cam signal becomes HIGH in the first front-rear determination position, the cam signal read value is set to "2 (HIGH)", and also the cam signal expected value is set to "2 (HIGH)". At this time, the cam signal read value and the cam signal expected value are equal to each other, accordingly, the cam signal read value "2 (HIGH)" is selected as the cam signal selection value, and the cylinder distinguishing value is set to "4", which indicates the fourth cylinder, with the use of the selection value. After that, when the crank signal is counted and it is detected that crank shaft 130 has rotated 180°, the cylinder distinguishing value is interpolated from "4" to "2" which indicates the second cylinder.

When the cam signal becomes LOW in the front-rear determination position of the next control cycle, the cam signal read value is set to "1 (LOW)", and also the cam signal expected value is set to "1 (LOW)". At this time, the cam signal read value and cam signal expected value are equal to each other, and accordingly, the cam signal read value "1 (LOW)" is selected as the cam signal selection value, and the cylinder distinguishing value is set to "1", which indicates the first cylinder, with the use of the selection value. After that, when the crank signal is counted and it is detected that crank shaft 130 has rotated 180°, the cylinder distinguishing value is interpolated from "1" to "3" which indicates the third cylinder.

When noise is superimposed on the cam signal in the front-rear determination position of the next control cycle and the cam signal becomes LOW in a single event, the cam signal read value is set to "1 (LOW)", and also the cam signal expected value is set to "2 (HIGH)". At this time, the cam signal read value and the cam signal expected value are different from each other, and accordingly, the cam signal expected value "2 (HIGH)" is selected as the cam signal selection value, and the cylinder distinguishing value is set to "4", which indicates the fourth cylinder, with the use of the selection value. After that, when the crank signal is counted and it is detected that crank shaft 130 has rotated 180°, the cylinder distinguishing value is interpolated from "4" to "2", which indicates the second cylinder. In addition, because the cam signal read value does not change as expected, the abnormality counter is counted up from "0" to "1".

When the noise superimposition is eliminated in the front-rear determination position of the next control cycle and the cam signal becomes LOW, the cam signal read value is set to "1 (LOW)", and also the cam signal expected value is set to "1 (LOW)". At this time, the cam signal read value and cam signal expected value are equal to each other, and accordingly, the cam signal read value "1 (LOW)" is selected as the cam signal selection value, and the cylinder distinguishing value is set to "1" which indicates the first cylinder, with the use of the selection value. After that, when the crank signal is counted and it is detected that crank shaft 130 has rotated 180°, the cylinder distinguishing value is interpolated from "1" to "3", which indicates the third cylinder. In addition, because the cam signal read value does not change as expected, the abnormality counter is counted up from "1" to "2".

Figure 15:
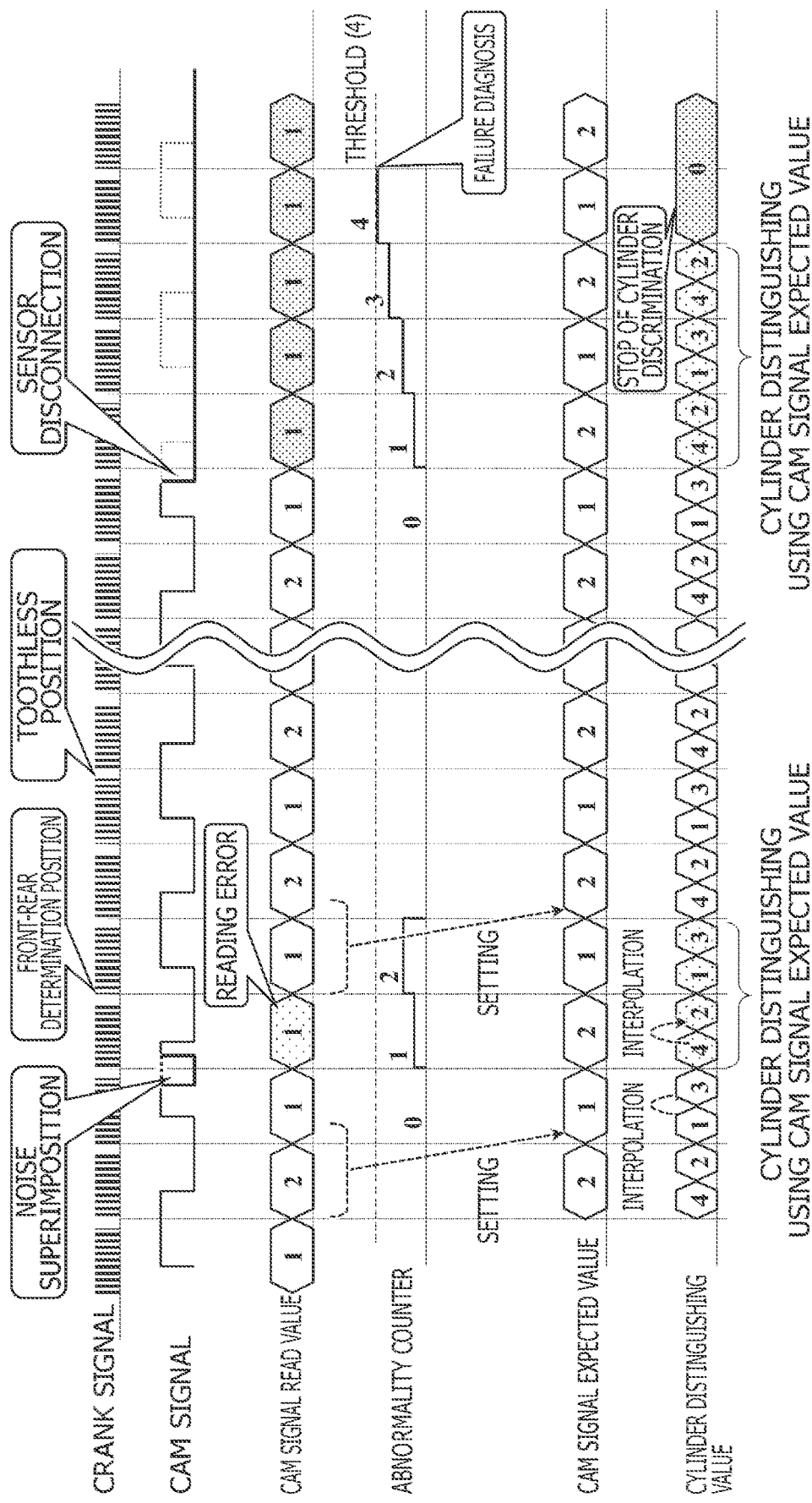
FIG. 15 is an explanatory diagram of an embodiment in which a cam angle sensor is disconnected in a four-cylinder engine.

After that, when a disconnection occurs in cam angle sensor 260, as is illustrated in FIG. 15, the cam signal becomes LOW in the front-rear determination position of the control cycle after the disconnection has occurred, the cam signal read value is set to "1 (LOW)", and also the cam signal expected value is set to "2 (HIGH)". At this time, the cam signal read value and the cam signal expected value are different from each other, and accordingly, the cam signal expected value "2 (HIGH)" is selected as the cam signal selection value, and the cylinder distinguishing value is set to "4", which indicates the fourth cylinder, with the use of the selection value. After that, when the crank signal is counted and it is detected that crank shaft 130 has rotated 180°, the cylinder distinguishing value is interpolated from "4" to "2", which indicates the second cylinder. In addition, because the cam signal read value changes as expected, the abnormality counter is reset to "0".

When there is disconnection in cam angle sensor 260, the cam signal is always LOW, and accordingly, also in the front-rear determination position of the control cycle after that, the cam signal remains LOW; and the cam signal read value is set to "1 (LOW)", and also the cam signal expected value is set to "1 (LOW)" or "2 (HIGH)". At this time, if the cam signal read value and the cam signal expected value are equal to each other, the cam signal read value is selected as the cam signal selection value; and if the cam signal read value and cam signal expected value are different from each other, the cam signal expected value is selected as the cam signal selection value, and the cylinder distinguishing value is set to "4" or "1", which respectively indicate the fourth cylinder or the first cylinder, with the use of the selection value. After that, when the crank signal is counted and it is detected that crank shaft 130 has rotated 180°, the cylinder distinguishing value is interpolated from "4" or "1" to "2" or "3", which indicate the second cylinder or the third cylinder. In addition, because the cam signal read value does not change as expected, "1" is sequentially added to the abnormality counter, and the abnormality counter is counted up. Then, when the abnormality counter reaches a predetermined threshold value (for example, "4"), it is diagnosed that a failure has occurred in cam angle sensor 260, and the cylinder distinguishing value is set to "0" so that cylinders are prevented from being inappropriately controlled. Note that after an abnormality has occurred in cam angle sensor 260, cam angle sensor 260 is not used, but the crank signals of crank angle sensor 240 are counted, and thereby the cylinders can be distinguished.

Figure 16:
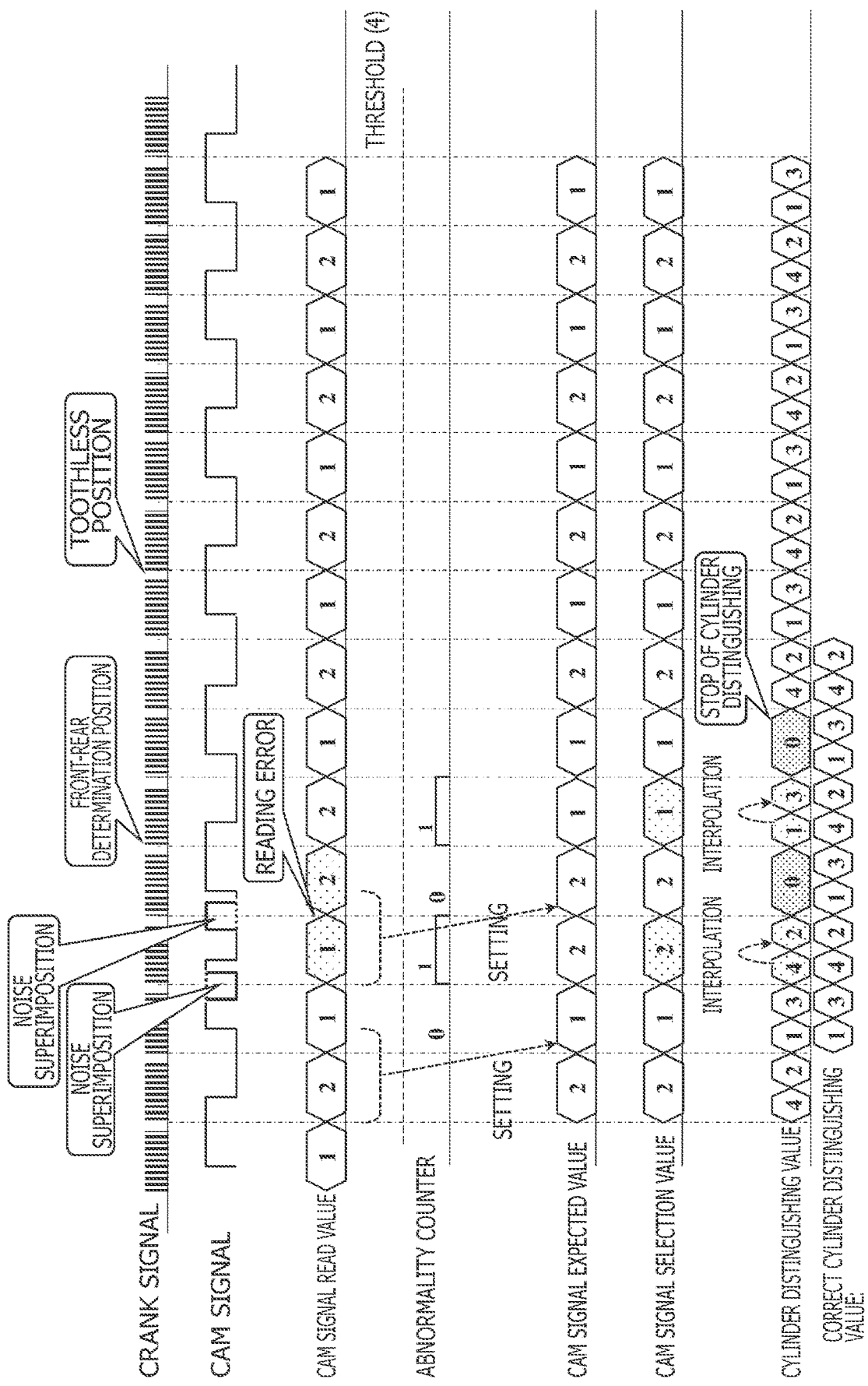
FIG. 16 is an explanatory diagram of an embodiment in which a cam signal becomes abnormal twice consecutively in a four-cylinder engine.

FIG. 16 illustrates an embodiment in which the cam signal has become abnormal twice consecutively.

In the front-rear determination position of the control cycle in which the cam signal has become abnormal in the second time, when the cam signal to become LOW becomes HIGH due to noise superimposition, the cam signal read value is set to "2 (HIGH)". In addition, because the cam signal read value has changed from "1 (LOW)" to "2 (HIGH)" as expected, the cam signal expected value is set to the cam signal read value, and becomes "2 (HIGH)". At this time, the cam signal read value and the cam signal expected value are equal to each other, and accordingly, the cam signal read value is selected as the cam signal selection value, and becomes "2 (HIGH)". However, because the cam signal selection value has not changed from the control cycle of the previous time, in other words, because the cam signal or the cam signal expected value which has been used for distinguishing the cylinder has not changed, the cylinder distinguishing value is set to "0 (stop of cylinder distinguishing)". It is to be noted that, regarding the counting of the abnormality counter, the interpolation of the cylinder distinguishing value, and the like, refer to the previous description if necessary (the same applies hereinafter).

When the noise superimposition is eliminated in the front-rear determination position of the next control cycle and the cam signal becomes HIGH, the cam signal read value is set to "2 (HIGH)", and also the cam signal expected value is set to "1 (LOW)". At this time, the cam signal read value and the cam signal expected value are different from each other, and accordingly, the cam signal expected value "1 (LOW)" is selected as the cam signal selection value, and the cylinder distinguishing value is set to "1" which indicates the first cylinder, with the use of the selection value.

When the cam signal becomes LOW in the front-rear determination position of the next control cycle, the cam signal read value is set to "1 (LOW)", and also the cam signal expected value is set to "1 (LOW)". At this time, the cam signal read value and the cam signal expected value are equal to each other, and accordingly, the cam signal read value "1 (LOW)" is set as the cam signal setting value. However, because the cam signal selection value has not changed from the control cycle of the previous time, the cylinder distinguishing value is set to "0 (stop of cylinder distinguishing)".

After that, when the cam signal becomes HIGH in the front-rear determination position of the control cycle, the cam signal read value is set to "2 (HIGH)", and also the cam signal expected value is set to "2 (HIGH)". At this time, the cam signal read value and the cam signal expected value are equal to each other, and accordingly, the cam signal read value "2 (HIGH)" is selected as the cam signal selection value, and the cylinder distinguishing value is set to "4", which indicates the fourth cylinder, with the use of the selection value, and the cylinder distinguishing is restarted.

Figure 17:
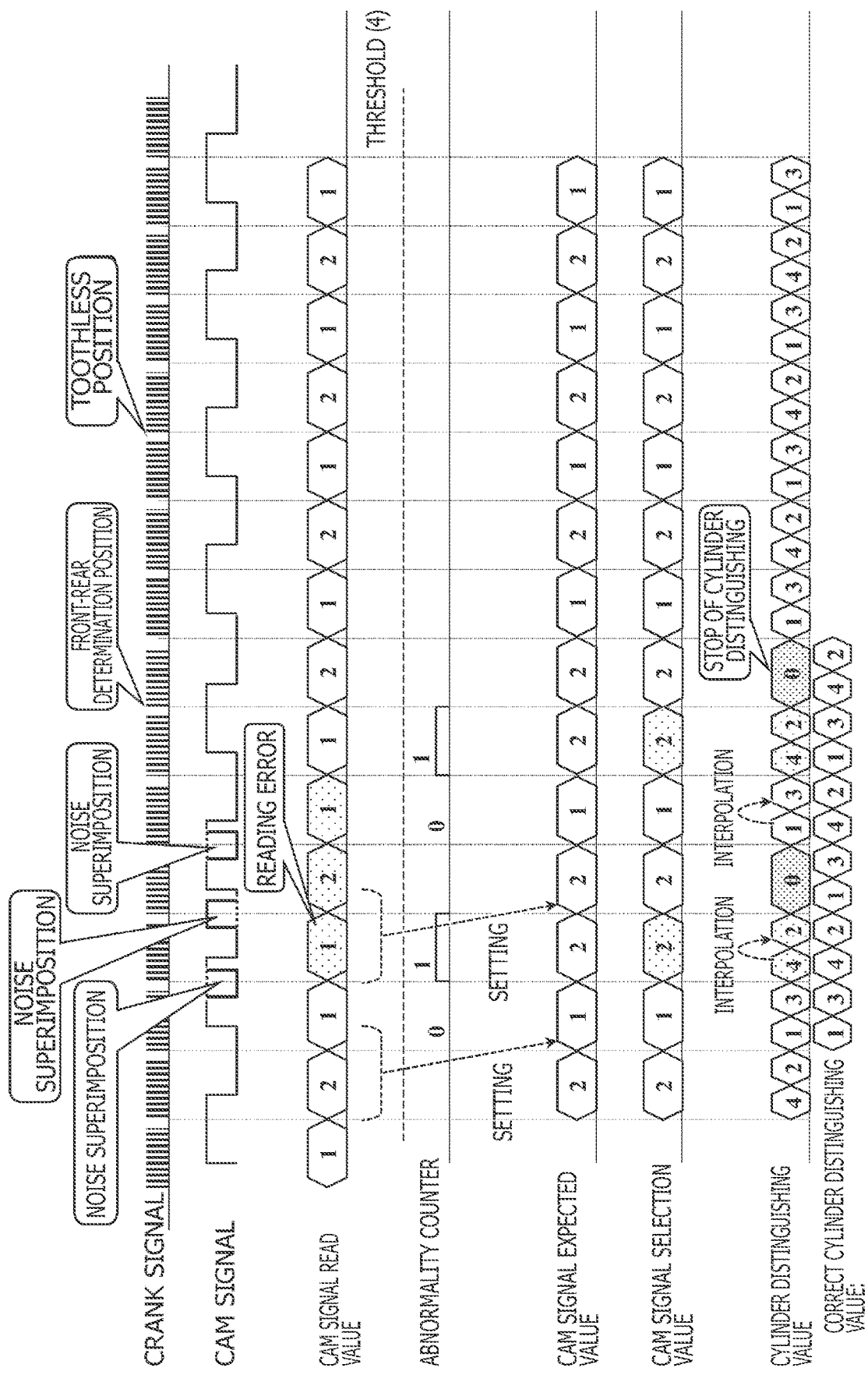
FIG. 17 is an explanatory diagram of an embodiment in which a cam signal becomes abnormal three times consecutively in a four-cylinder engine.

FIG. 17 illustrates an embodiment in which the cam signal has become abnormal three times consecutively.

In the front-rear determination position of the control cycle in which the cam signal has become abnormal in the third time, when the cam signal to be HIGH becomes LOW due to noise superimposition, the cam signal read value is set to "1 (LOW)". In addition, because the cam signal read value has changed from "2 (HIGH)" to "1 (LOW)" as expected, the cam signal expected value is set to the cam signal read value, and becomes "1 (LOW)". At this time, the cam signal read value and cam signal expected value are equal to each other, and accordingly, the cam signal read value is selected as the cam signal selection value, and the cylinder distinguishing value is set to "1", which indicates the first cylinder, with the use of the selection value.

When the noise superimposition is eliminated in the front-rear determination position of the next control cycle and the cam signal becomes LOW, the cam signal read value is set to "1 (LOW)", and also, the cam signal expected value is set to "2 (HIGH)". At this time, the cam signal read value and the cam signal expected value are different from each other, and accordingly, the cam signal expected value "2 (HIGH)" is selected as the cam signal selection value, and the cylinder distinguishing value is set to "4", which indicates the fourth cylinder, with the use of the selection value. Note that the subsequent process is the same as that in the previous embodiment, and a description thereof will be omitted. If necessary, please refer to the previous description.

Accordingly, those skilled in the art can easily understand that the lowering of the cylinder distinguishing accuracy can be suppressed, because even if noise is superimposed on the cam signal and an abnormality occurs, the cylinders can be distinguished with the use of the cam signal expected value.

Second Embodiment

Figure 18:
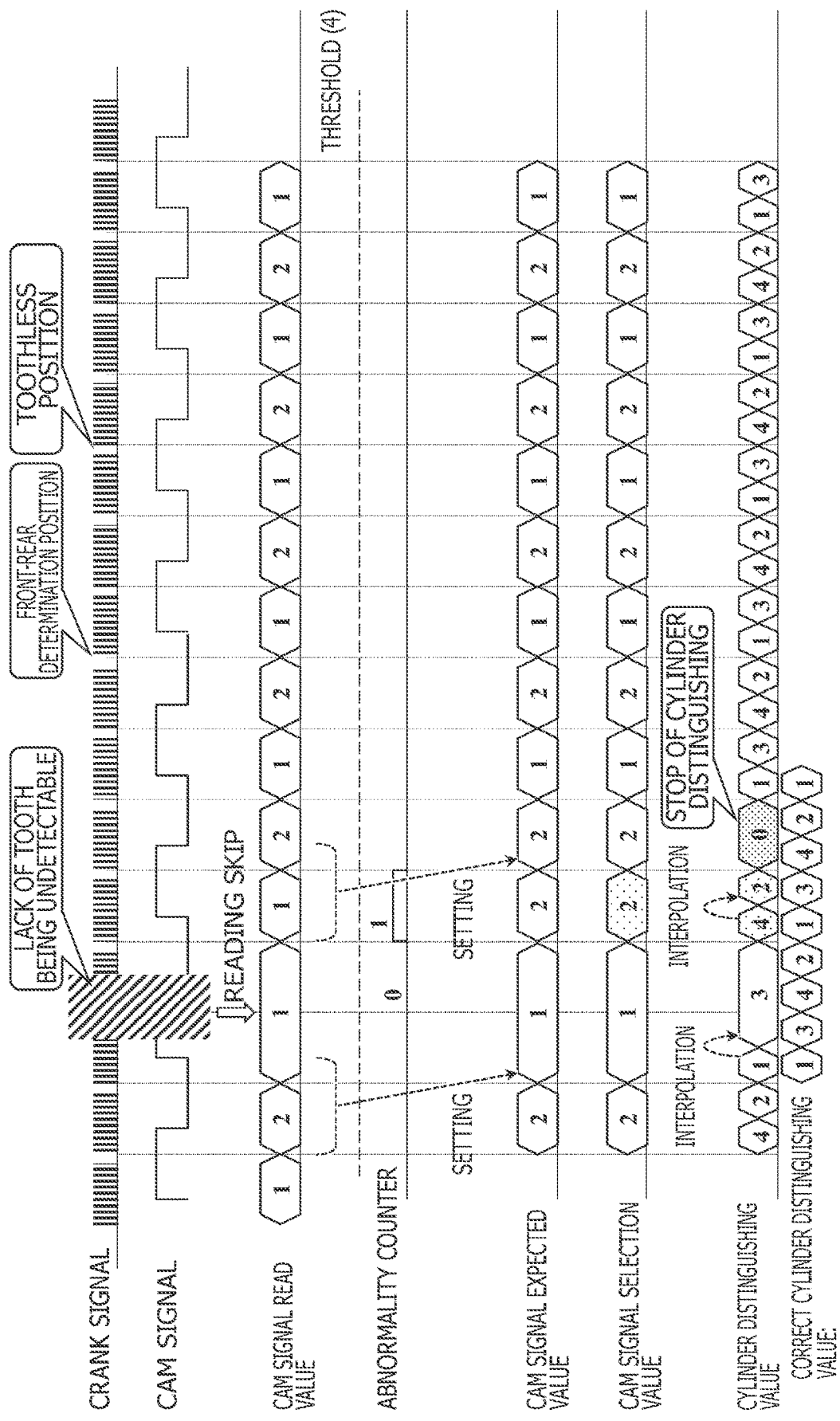
FIG. 18 is an explanatory diagram of an embodiment in which an electronic control unit becomes incapable of detecting a missing tooth in a single event in a four-cylinder engine.

FIG. 18 illustrates an embodiment in which the crank signal becomes abnormal, and it becomes impossible for ECM 270 to detect the missing tooth in a single event.

When the cam signal becomes LOW in the front-rear determination position of the control cycle immediately before the crank signal becomes abnormal, the cam signal read value is set to "1 (LOW)", and also the cam signal expected value is set to "1 (LOW)". At this time, the cam signal read value and cam signal expected value are equal to each other, and accordingly, the cam signal read value "1 (LOW)" is selected as the cam signal selection value, and the cylinder distinguishing value is set to "1", which indicates the first cylinder, with the use of the selection value.

When the crank signal becomes abnormal and it becomes impossible for ECM 270 to detect the missing tooth, it becomes impossible for ECM 270 to specify the front-rear determination position, and accordingly, the reading of the cam signal may be skipped. For this reason, the cam signal read value, the cam signal expected value, the cam signal selection value, and the cylinder distinguishing value remain the same as the previous values. Then, when the cam signal becomes LOW in the front-rear determination position of the next control cycle, the cam signal read value is set to "1 (LOW)", and also the cam signal expected value is set to "2 (HIGH)". At this time, the cam signal read value and the cam signal expected value are different from each other, and accordingly, the cam signal expected value "2 (HIGH)" is selected as the cam signal selection value, and the cylinder distinguishing value is set to "4", which indicates the fourth cylinder, with the use of the selection value.

When the cam signal becomes HIGH in the front-rear determination position of the next control cycle, the cam signal read value is set to "2 (HIGH)", and also the cam signal expected value is set to "2 (HIGH)". At this time, the cam signal read value and the cam signal expected value are equal to each other, and accordingly, the cam signal read value "2 (HIGH)" is selected as the cam signal selection value. However, because the cam signal selection value has not changed from the control cycle of the previous time, "0 (stop of cylinder distinguishing)" is set as the cylinder distinguishing value. After that, when the reading of the cam signal becomes normal, the cylinder distinguishing value is set to "1" which indicates the first cylinder, through a similar process.

Accordingly, those skilled in the art will be able to easily understand that the reduction of cylinder distinguishing accuracy can be suppressed, because even if noise is superimposed on the crank signal and it becomes temporarily impossible to detect a missing tooth, the cylinders can be distinguished with the use of the cam signal expected value. It should be noted that, when the cylinder distinguishing value has been set to "0" and the cylinder distinguishing has been stopped, the fuel injection and ignition are not performed during one control cycle but when the noise superimposition is eliminated after that, the fuel injection and ignition are restored, and accordingly no significant trouble occurs.

The present embodiment can be applied not only to engine 100 having four cylinders, but also to engines 100 having two cylinders, three cylinders, and five cylinders or more.

Figure 19:
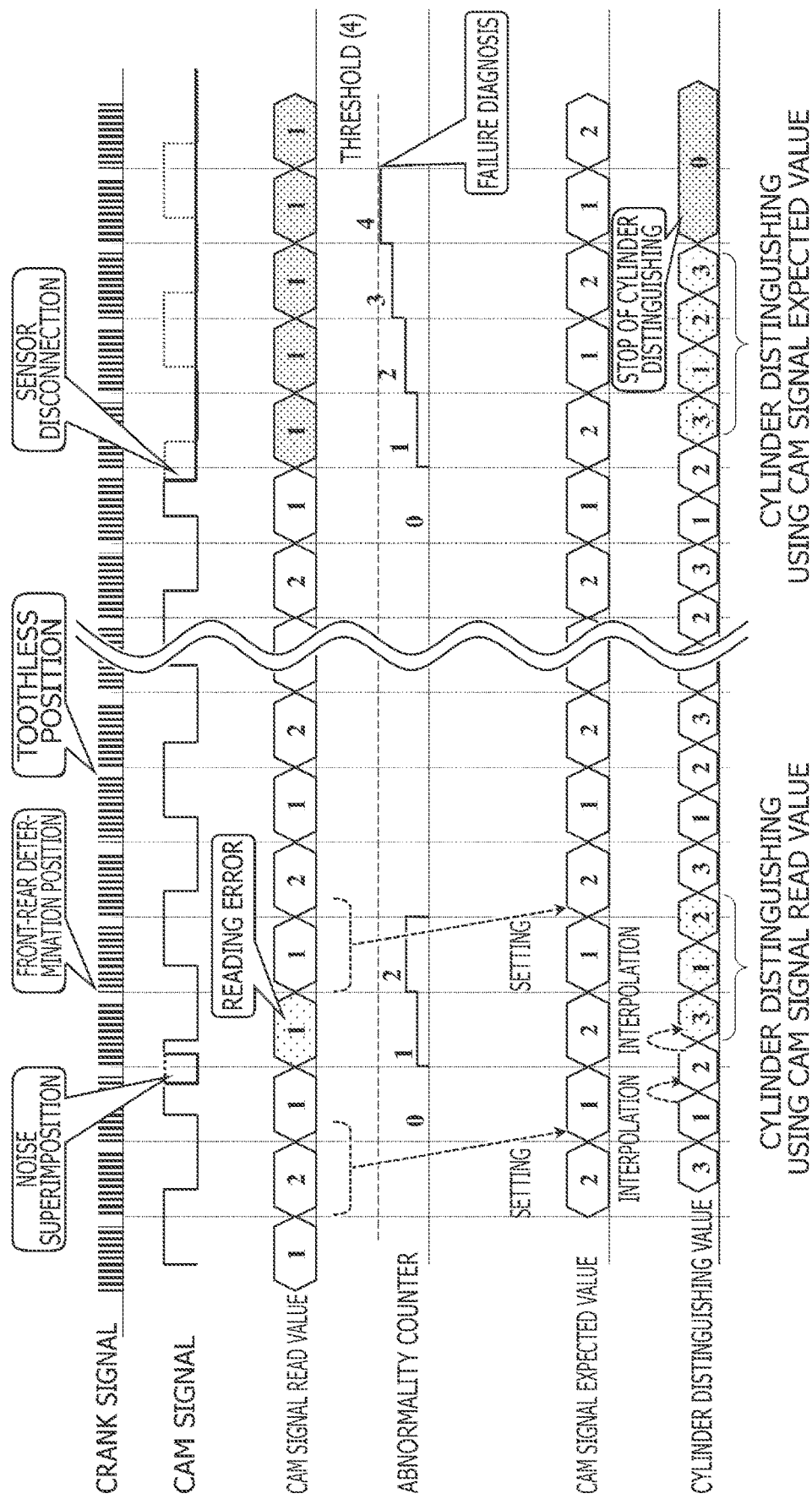
FIG. 19 is an explanatory diagram of an embodiment in which a cam signal becomes abnormal in a single event in a three-cylinder engine.

FIG. 19 illustrates an embodiment in which a cam signal has become abnormal in a single event in engine 100 having three cylinders.

When the cam signal becomes LOW in the front-rear determination position of the control cycle immediately before the cam signal becomes abnormal, the cam signal read value is set to "1 (LOW)", and also the cam signal expected value is set to "1 (LOW)". At this time, the cam signal read value and cam signal expected value are equal to each other, and accordingly, the cam signal read value "1 (LOW)" is selected as the cam signal selection value, and the cylinder distinguishing value is set to "1", which indicates the first cylinder, with the use of the selection value. After that, when the crank signal is counted and it is detected that crank shaft 130 has rotated 240°, the cylinder distinguishing value is sequentially interpolated from "1" to "2" and "3", which indicates the second cylinder and the third cylinder.

When the cam signal to become HIGH in the front-rear determination position of the next control cycle becomes LOW due to noise superimposition, the cam signal read value is set to "1 (LOW)", and also the cam signal expected value is set to "2 (HIGH)". At this time, the cam signal read value and cam signal expected value are different from each other, but as a characteristic of the three-cylinder engine 100, the cylinder distinguishing value is updated by interpolation over two control cycles, and accordingly, ECM 270 can reduce the risk of the cylinder distinguishing value being wrong.

Accordingly, those skilled in the art will understand that the present embodiment is equally applicable to engine 100 having any number of cylinders.

In addition, those skilled in the art will readily understand that new embodiments can be created by omitting a part of the technical concept of the above various embodiments, combining parts of the embodiments as appropriate, or substituting a part of the embodiments.

REFERENCE SYMBOL LIST

230 Crank plate
240 Crank angle sensor
250 Cam plate
260 Cam angle sensor
270 ECM (Electronic Control Unit)

The invention claimed is:

1. An engine control device comprising:
a crank angle sensor that outputs a crank signal including an angular position signal for every predetermined angle and a reference position signal for every crank angle of 360°, with rotation of a crank shaft;
a cam angle sensor that outputs cam signals at different levels between a front reference position and a rear reference position of the crank signals, with rotation of a cam shaft; and
an electronic control unit configured to determine an expected value according to a changed state of the cam signal, and to distinguish among cylinders with the use of the cam signal when a value of the cam signal is equal to the expected value, and to distinguish among the cylinders by the use of the expected value when a value of the cam signal is different from the expected value, wherein
when a cam position has become a front-rear determination position specified by counting of the crank signals, a cam signal read value is set according to the cam signal, an abnormality counter is updated, and a cam signal selection value is selected according to a changed state of the cam signal read value;
when the cam position has become the cylinder distinguishing position specified by counting of the crank signals, a cylinder distinguishing value is set according to the cam signal selection value;
when the cam signal read value has changed, the abnormality counter is reset and a value of the cam signal read value is updated to match a value of the expected value; and
when the cam signal read value has not changed, the abnormality counter is updated, and the expected value is updated to match a value corresponding to an inverted value of the expected value at a previous measurement time;
wherein
the cam signal read value is a measure of the rotation of the cam shaft;
the expected value is a stored value of the expected rotation of the cam shaft; and
the abnormality counter counts the number of occasions that the cam signal read value has consecutively caused abnormality.

2. The engine control device according to claim 1, wherein
the electronic control unit is configured to determine the expected value from characteristics of inverting a front to a rear, if the cam signal is normal.

3. The engine control device according to claim 1, wherein
the electronic control unit is configured to diagnose that the cam angle sensor is faulty, when a state in which the cam signal does not change consecutively occurs a predetermined number of times.

4. The engine control device according to claim 3, wherein
the electronic control unit is configured to use only the crank signal to distinguish among the cylinders, when the cam angle sensor has been diagnosed to be faulty.

5. The engine control device according to claim 1, wherein
the electronic control unit is configured to stop cylinder distinguishing when the cam signal or the expected value does not change, the cam signal or the expected value being used for distinguishing the cylinders.

6. The engine control device according to claim 5, wherein
the electronic control unit is configured to restart cylinder distinguishing, when the cam signal or the expected value begins to change, the cam signal or the expected value being used for distinguishing the cylinders.

7. The engine control device according to claim 1, wherein
the electronic control unit is configured to determine the expected value, when at least one of a first condition that a front and a rear in the cam signal are inverted a plurality of times, and a second condition that an engine rotation speed is a predetermined speed or higher, are satisfied.

8. The engine control device according to claim 7, wherein
the second condition is that the engine rotation speed is the predetermined speed or higher, and has continued for a predetermined time or longer.

9. The engine control device according to claim 1, wherein the front reference position and rear reference position are defined by at least one toothless position of a crank plate.

10. The engine control method according to claim 1, wherein the front reference position and rear reference position are defined by at least one toothless position of a crank plate.

11. An engine control method, wherein
an electronic control unit can read each of output signals from a crank angle sensor that outputs crank signals including an angular position signal for every predetermined angle and a reference position signal for every crank angle of 360°, with rotation of a crank shaft, and from a cam angle sensor that outputs cam signals at different levels between a front reference position and a rear reference position of the crank signals, with a rotation of a cam shaft; and
determines an expected value according to a changed state of the cam signal, distinguishes cylinders with the use of the cam signal when a value of the cam signal is equal to the expected value, and distinguishes the cylinders with the use of the expected value when a value of the cam signal is different from the expected value, wherein
when a cam position has become a front-rear determination position specified by counting of the crank signals, a cam signal read value is set according to the cam signal, an abnormality counter is updated, and a cam signal selection value is selected according to a changed state of the cam signal read value;
when the cam position has become the cylinder distinguishing position specified by counting of the crank signals, a cylinder distinguishing value is set according to the cam signal selection value; wherein
when the cam signal read value has changed, the abnormality counter is reset and a value of the cam signal read value is updated to match a value of the expected value; and
when the cam signal read value has not changed, the abnormality counter is updated, and the expected value is updated to match a value corresponding to an inverted value of the expected value at a previous measurement time;
wherein
the cam signal read value is a measure of the rotation of the cam shaft;

the expected value is a stored value of the expected rotation of the cam shaft; and the abnormality counter counts the number of occasions that the cam signal read value has consecutively caused abnormality.

12. The engine control method according to claim 11, wherein the electronic control unit determines the expected value according to characteristics of inverting a front to a rear, when the cam signal is normal.

13. The engine control method according to claim 11, wherein the electronic control unit diagnoses that the cam angle sensor is faulty, when a state in which the cam signal does not change consecutively occurs a predetermined number of times.

14. The engine control method according to claim 13, wherein the electronic control unit uses only the crank signal to distinguish among cylinders, when the cam angle sensor is diagnosed to be faulty.

15. The engine control method according to claim 11, wherein the electronic control unit stops cylinder distinguishing when the cam signal or the expected value does not change, the cam signal or the expected value being used for distinguishing the cylinders.

16. The engine control method according to claim 15, wherein the electronic control unit restarts cylinder distinguishing when the cam signal or the expected value begins to change, the cam signal or the expected value being used for distinguishing among the cylinders.

17. The engine control method according to claim 11, wherein the electronic control unit determines the expected value, when at least one of a first condition that a front and a rear in the cam signal are inverted a plurality of times, and a second condition that an engine rotation speed is a predetermined speed or higher, are satisfied.

18. The engine control method according to claim 17, wherein the second condition is that the engine rotation speed is the predetermined speed or higher, and has continued for a predetermined time or longer.

* * * * *